(12) United States Patent
Kitora et al.

(10) Patent No.: US 7,447,384 B2
(45) Date of Patent: Nov. 4, 2008

(54) IMAGE PROCESSING METHOD AND APPARATUS

(75) Inventors: Masakazu Kitora, Kanagawa (JP); Hiroyuki Tsuji, Kanagawa (JP); Shinichi Kato, Kanagawa (JP); Yasuki Nakajima, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1113 days.

(21) Appl. No.: 10/670,278

(22) Filed: Sep. 26, 2003

(65) Prior Publication Data

US 2004/0062522 A1 Apr. 1, 2004

(30) Foreign Application Priority Data

Sep. 27, 2002 (JP) ............................. 2002-284241
Jun. 23, 2003 (JP) ............................. 2003-178606
Jul. 25, 2003 (JP) ............................. 2003-201925

(51) Int. Cl.
*G06K 9/54* (2006.01)

(52) U.S. Cl. ...................... 382/305; 382/232; 382/233; 382/294

(58) Field of Classification Search ............... 382/294, 382/232, 233, 100, 305, 239, 169; 380/220; 386/E5.015; 375/E7.09, E7.026, E7.13, 375/E7.157, E7.241, E7.14, E7.045; 725/151, 725/131; 370/428, 412, 232; 348/384.1; 709/247

See application file for complete search history.

(56) References Cited

U.S. PATENT DOCUMENTS 5,646,959 A * 7/1997 Kamishima ................. 375/240

| | | | | |
|---|---|---|---|---|
| 6,774,940 B1 * | 8/2004 | Ogura et al. | ........... | 348/231.99 |
| 6,925,209 B2 * | 8/2005 | Boliek et al. | ................. | 382/239 |
| 6,980,320 B2 * | 12/2005 | Ito | ............................. | 358/1.18 |
| 7,194,140 B2 | 3/2007 | Ito et al. | ...................... | 382/251 |
| 7,257,264 B2 | 8/2007 | Nakayama et al. | .......... | 382/239 |
| 2003/0002743 A1 | 1/2003 | Ohta et al. | ................... | 382/239 |
| 2003/0031371 A1 | 2/2003 | Kato et al. | ................... | 382/239 |
| 2003/0043905 A1 | 3/2003 | Nakayama et al. | ...... | 375/240.04 |
| 2003/0086127 A1 | 5/2003 | Ito et al. | ..................... | 358/462 |
| 2003/0086597 A1 | 5/2003 | Ohta et al. | ................... | 382/131 |

FOREIGN PATENT DOCUMENTS

| JP | 2003-69831 | 3/2003 |
|---|---|---|
| JP | 2003-101793 | 4/2003 |
| JP | 2003-143413 | 5/2003 |

* cited by examiner

*Primary Examiner*—Anh Hong Do
(74) *Attorney, Agent, or Firm*—Fitzpatrick, Cella, Harper & Scinto

(57) ABSTRACT

There is provided an image processing method which can provide appropriate image property information in accordance with the operation mode, and can realize a more preferable image process by arbitrarily switching the priority of image property information to be added. To this end, image data which contains first image property information for each predetermined unit is input from a scanner (1002), and is segmented by a tile bus (1048). Each segmented data is compressed by a tile compression section (1047). Compressed image data is stored in a memory such as a RAM (1021) or the like. In this case, if the size of the compressed image data is equal to or larger than a predetermined size, image data excluding first image property information is stored. On the other hand, when second image property information is designated by a UI (1032) or CPU (1006), and image data is output to be printed by a printer (1003), the second image property information is set as image property information of image data expanded by an expansion section (1044) by an image property information substitution section (1058).

11 Claims, 31 Drawing Sheets

FIG. 9
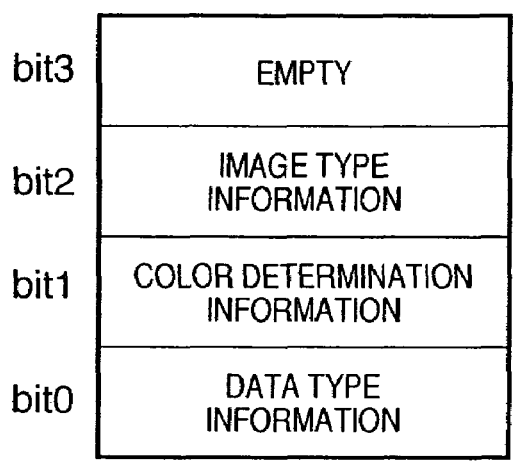
INPUT SOURCE 0
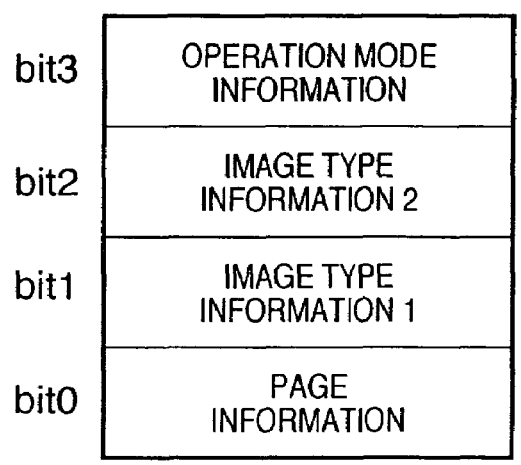
INPUT SOURCE 1

F I G. 21
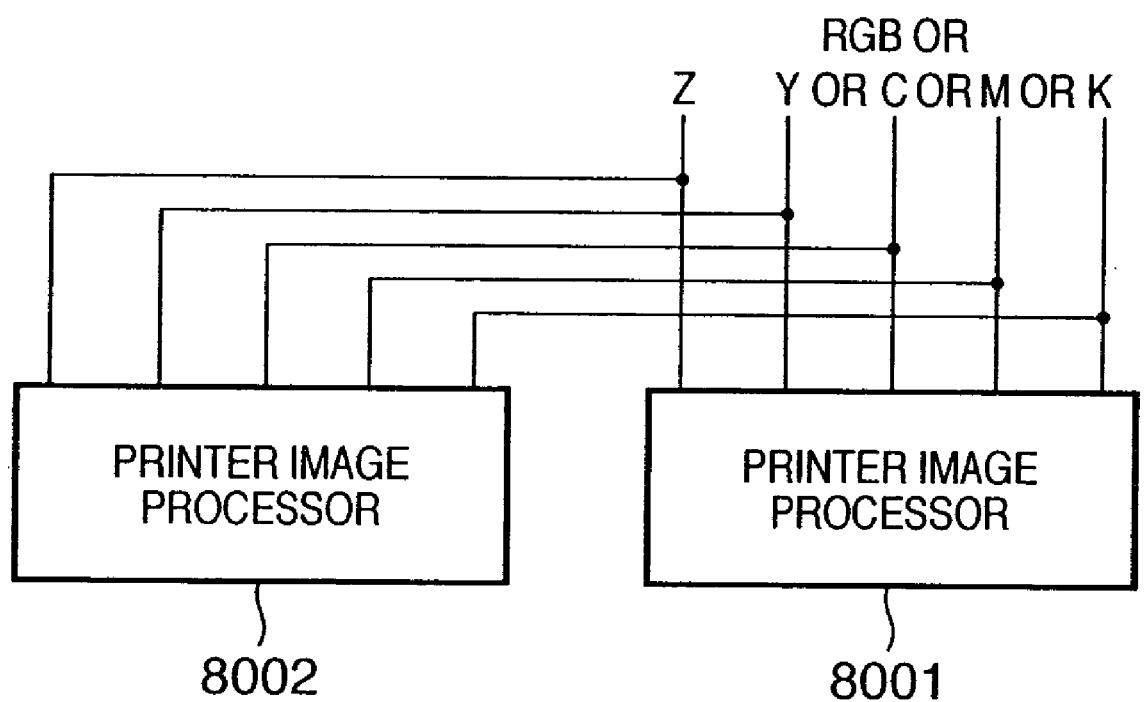

FIG. 27

| bit2 | bit1 | bit0 |
|---|---|---|
| TEXT FLAG | ISOLATED POINT FLAG | CHROMATIC / ACHROMATIC COLOR |

IMAGE PROCESSING METHOD AND APPARATUS

FIELD OF THE INVENTION

The present invention relates to an image processing method and apparatus for suitably compensating for omitted image property information.

BACKGROUND OF THE INVENTION

Conventionally, an image processing apparatus which comprises an image data compression device for compressing image data read from an image input device, and a data storage device for storing image data compressed by the image data compression device, is known.

In an image processing apparatus that compresses an image by variable length coding of these image processing apparatuses, when the size of image data transmitted from an image data compression device has exceeded the storage capacity of a data storage device that stores image data, the image input process must be redone, and an image must be compressed again at a compression ratio higher than the previous one. Alternatively, the data size of image data transmitted from the image data compression device is counted, and when the transmitted image data size has exceeded a predetermined value, transmission of image property information is stopped to prevent the data size from exceeding the storage capacity of the data storage device, thus avoiding a re-input process of image data. However, if transmission of image property information is stopped, since the image property information is not available, an image process inside the image processing apparatus or an image correction process upon printing cannot be optimally made, and a desired image processing result cannot often be obtained.

For this reason, a conventional image processing system which compensates for omitted image property information by adding substitute information as header information upon transferring image data is known.

However, by merely adding substitute information (image property information) upon compressing image data, since substitute information is determined for each data transfer unit of the image data compression device, the substitute information is switched within a page from the beginning of new transfer of image data upon outputting image data, resulting in image quality deterioration. Also, some users cannot often determine on one of substitute information values to be set depending on their favors.

In the conventional image processing system, upon printing image data or transferring image data via a network, image data and image property information (attribute information indicating regions (e.g., a text region, photo region, and the like) to which pixels that form an image belong) are transferred after they are compressed. This is to improve the performance of the system as a whole by reducing the data size of data to be transferred.

However, there is no guarantee that the compression result of image data has a smaller data size than that before compression, and some image data may have a larger size than that before compression, thus lowering the performance of the overall system. For this reason, an image processing system, which accumulates the image data size before compression, and ceases to add image property information to transfer data when the compressed data size has reached a threshold value that influences the performance of the whole system, has been proposed.

Also, a conventional technique which compresses an image for respective tiles in a compression process has been proposed (e.g., refer to patent reference 1 (Japanese Patent Laid-Open No. 2003-69831)).

However, with the aforementioned conventional technique, upon executing an image process or the like by expanding image data with a poor compression ratio (compressed image data which has a larger data size than that before compression) again, since the image property information has been lost, a high-quality process that exploits the image property information cannot be done.

Furthermore, a conventional image processing apparatus which compresses an image comprises an image data compression unit for compressing image data read from an image input unit, and a data storage unit for storing image data compressed by the image data compression unit.

However, in this prior art, when the size of compressed image data which has been compressed by the image data compression unit and is to be stored in the data storage unit has exceeded the memory size of the data storage unit, the image must be re-input to the image input unit, compression parameters that can compress the image at a higher compression ratio than the previous one must be re-set in the image data comparison unit, and the re-input image data must be compressed again using the re-set compression parameters.

In addition, for example, the image data compression unit counts the size (data size) of compressed image data, and when the count value has exceeded a predetermined size, transmission of image property information is stopped to prevent the size of image data to be stored in the data storage unit from exceeding the memory size of the data storage unit, thus avoiding a re-input process of image data. In this case, since image property information (attribute information indicating regions (e.g., a text region, photo region, and the like) to which pixels that form an image belong) is omitted from the middle of data, an image process inside the apparatus or an image correction process upon printing cannot be optimally made, and a desired image processing result cannot often be obtained.

SUMMARY OF THE INVENTION

The present invention has been proposed to solve the conventional problems, and has as its object to provide an image processing method and apparatus which can provide appropriate image property information in correspondence with an operation mode, and can realize a preferred image process by arbitrarily switching priority of image property information be added.

In order to solve the above object, an image processing method according to the present invention is comprising:

an input step of inputting compressed image data;

an expansion step of expanding the compressed image data;

an adding step of adding second image property information as image property information of the image data which is expanded without containing any first image property information; and an output step of outputting the image data which contains the first or second image property information.

The image processing method is further comprising:

an encoding step of encoding image data, and in that the encoding step comprises:

a segmentation step of segmenting image data, which contains the first image property information for each predetermined unit, into image data for respective predetermined units;

a compression step of compressing the segmented image data; and a storage step of storing, when a size of the compressed image data is not more than a predetermined size, image data containing the first image property information in a storage device, and storing, when a size of the compressed image data is not less than the predetermined size, image data excluding the first image property information in the storage device, and the input step includes a step of inputting the compressed image data stored in the storage device.

The image processing method is further comprising a print step of printing the expanded image data.

The image processing method is characterized in that the predetermined unit is a tile which forms an image for one page.

The image processing method is characterized in that the input step includes a step of inputting a packet which contains the compressed image data and a header.

The image processing method is characterized in that the adding step includes a step of determining, with reference to the header in the packet, whether or not the compressed image data in the packet contains the first image property information.

The image processing method is characterized in that the compression step includes a step of compressing the image data by JPEG, and compressing the first image property information by PackBits.

The image processing method is characterized in that the second image property information is contained in header information set for each predetermined unit of the image data.

The image processing method is characterized in that the second image property information is a representative value of image property information in the image data.

The image processing method is further comprising:

a count step of counting a data size of image data stored in the storage device;

a determination step of determining whether or not the counted data size of the image data has exceeded a predetermined size; and a stop step of stopping, when it is determined that the data size of the image data has exceeded the predetermined size, storage of the first image property information in the storage device.

The image processing method is further comprising a flag output step of outputting a flag indicating a data size of the compressed image data has exceeded a predetermined size.

The image processing method is also directed to an image processing method in an image processing apparatus which comprises an image property information storage device that stores second image property information, and the method is further comprising:

a substitution step of setting new image property information as image property information of image data which is expanded without containing any first image property information upon printing the image data;

a designation step of designating one of an operation mode that uses the second image property information stored in the image property information storage device as the new image property information and an operation mode that uses third image property information contained in header information set for each predetermined unit of the image data as the new image property information; and a print step of printing the expanded image data.

The image processing method is further comprising:

a designation step of designating second image property information used to set a page before coupling upon coupling image data of a plurality of pages into one page, and printing coupled image data;

a substitution step of setting the second image property information as image property information of the expanded image data upon printing the image data; and a print step of printing the expanded image data.

The image processing method is characterized in that the second image property information contains:

data type identification information used to identify a data type including a raster image and font data;

image type identification information used to identify one of text data and photo data; and color identification information used to identify one of grayscale data and color data.

The image processing method is characterized in that the second image property information contains:

page information used to identify a page before coupling upon printing image data of a plurality of pages on a single paper sheet;

image type identification information used to identify whether image data is continuous tone data or image data formed by area gradation; and information used to identify an operation mode of print means.

An image processing apparatus according to the present invention is comprising:

input means for inputting compressed image data;

expansion means for expanding the compressed image data;

adding means for adding second image property information as image property information of the image data which is expanded without containing any first image property information; and output means for outputting the image data which contains the first or second image property information.

A computer readable recording medium according to the present invention is characterized by storing a program for making a computer execute:

an input procedure for inputting compressed image data;

an expansion procedure for expanding the compressed image data;

an adding procedure for adding second image property information as image property information of the image data which is expanded without containing any first image property information; and an output procedure for outputting the image data which contains the first or second image property information.

According to the image processing method, apparatus, and recording medium, even when no image property information is added to compressed image data, a high-quality process that exploits image property information can be realized using this compressed image data.

Furthermore, according to the image processing method, apparatus, and recording medium, a technique which controls the data size after compression not to re-input an image, and suppresses image deterioration after compression can be provided.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 9 shows an example of image property information to be supplied to a printer image processing block 1061;

FIG. 21 is a block diagram showing the detailed arrangement of the printer image processing block 1061 according to the first embodiment;

FIG. 27 shows the format of image property information;

DETAILED DESCRIPTION OF THE PREFERRED EMBODIMENTS

An image processing apparatus which executes an image processing method according to an embodiment of the present invention will be described in detail hereinafter with reference to the accompanying drawings.

First Embodiment

[Overview of Network System]

Figure 12:
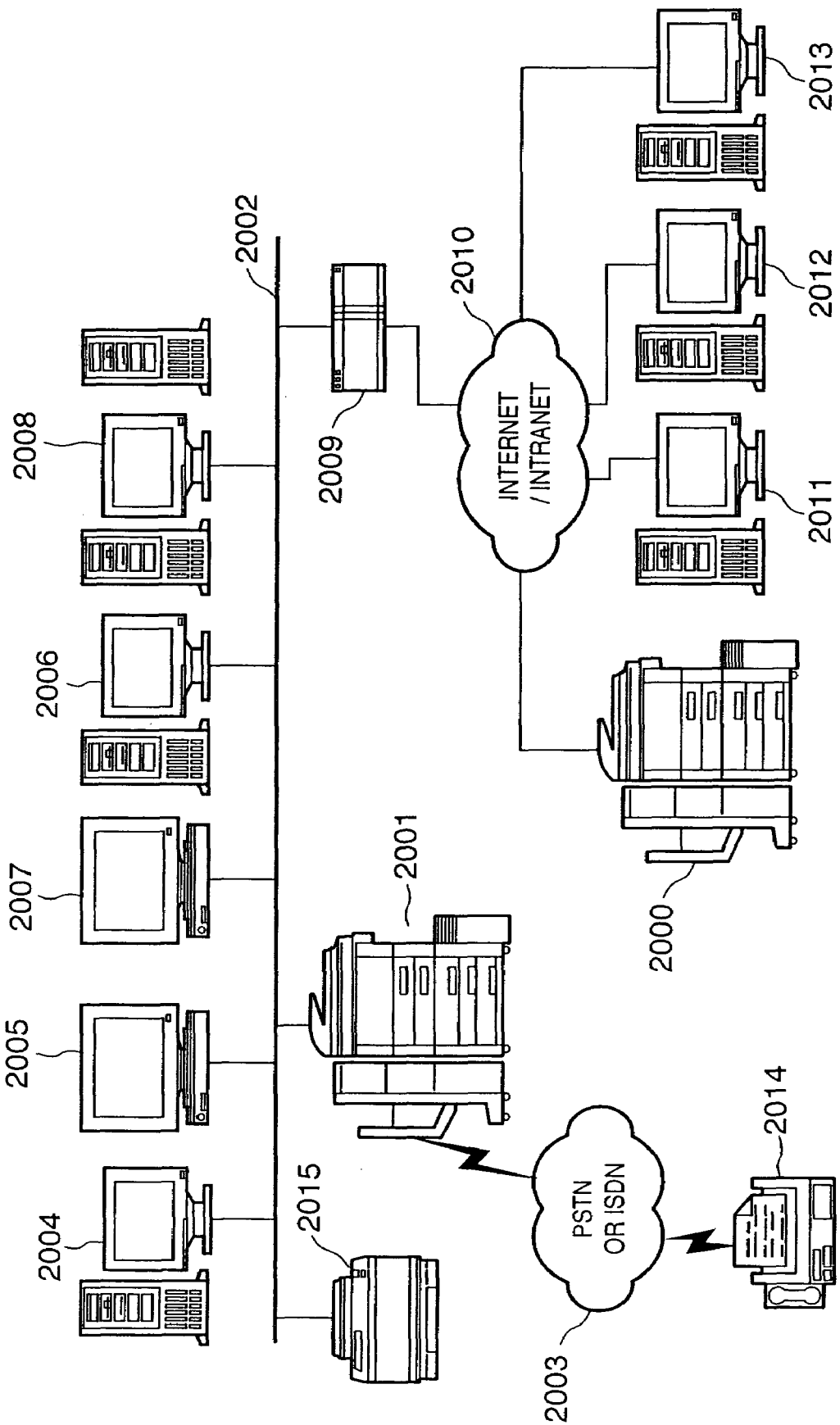
FIG. 12 is a diagram showing the arrangement of a whole network system which comprises an image processing apparatus according to the first embodiment of the present invention.

FIG. 12 shows the arrangement of a whole network system which comprises an image processing apparatus according to the first embodiment of the present invention. Referring to FIG. 12, an image processing apparatus 2001 according to the first embodiment of the present invention has a scanner and printer as building components, can output an image scanned by the scanner onto a local area network (LAN) 2002, and can print out an image received from the LAN 2002 using the printer. Also, the apparatus 2001 can transmit an image scanned by the scanner onto a PSTN or ISDN 2003 using a FAX transmission device (not shown) or can print out an image received via the PSTN or ISDN 2003 using the printer.

A database server 2004 manages binary images and multi-valued images scanned by the image processing apparatus 2001 as a database. A database client 2005 is a client-side device with respect to the database server 2004, and can browse/search image data saved in the database server 2004.

An e-mail server 2006 can receive an image scanned by the image processing apparatus 2001 as a file attached to an e-mail message. An e-mail client 2007 can receive and browse a mail message received by the e-mail server 2006, and can send an e-mail message. A WWW server 2008 provides HTML documents onto the LAN. The image processing apparatus 2001 can print out an HTML document provided by the WWW server 2008.

A router 2009 connects the LAN 2002 to an Internet/intranet 2010. To the Internet/intranet 2010, apparatuses similar to the aforementioned database server 2004, WWW server 2008, e-mail server 2006, and image processing apparatus 2001 according to this embodiment are connected as a database server 2011, WWW server 2012, e-mail server 2013, and image processing apparatus 2000, respectively. The image processing apparatus 2001 according to this embodiment can communicate with a FAX apparatus 2014 via the PSTN or ISDN 2003. A printer 2015 is connected on the LAN 2002, and can print out an image scanned by the image processing apparatus 2001 according to this embodiment.

[Overview of Image Processing Apparatus 2001]

Figure 13:
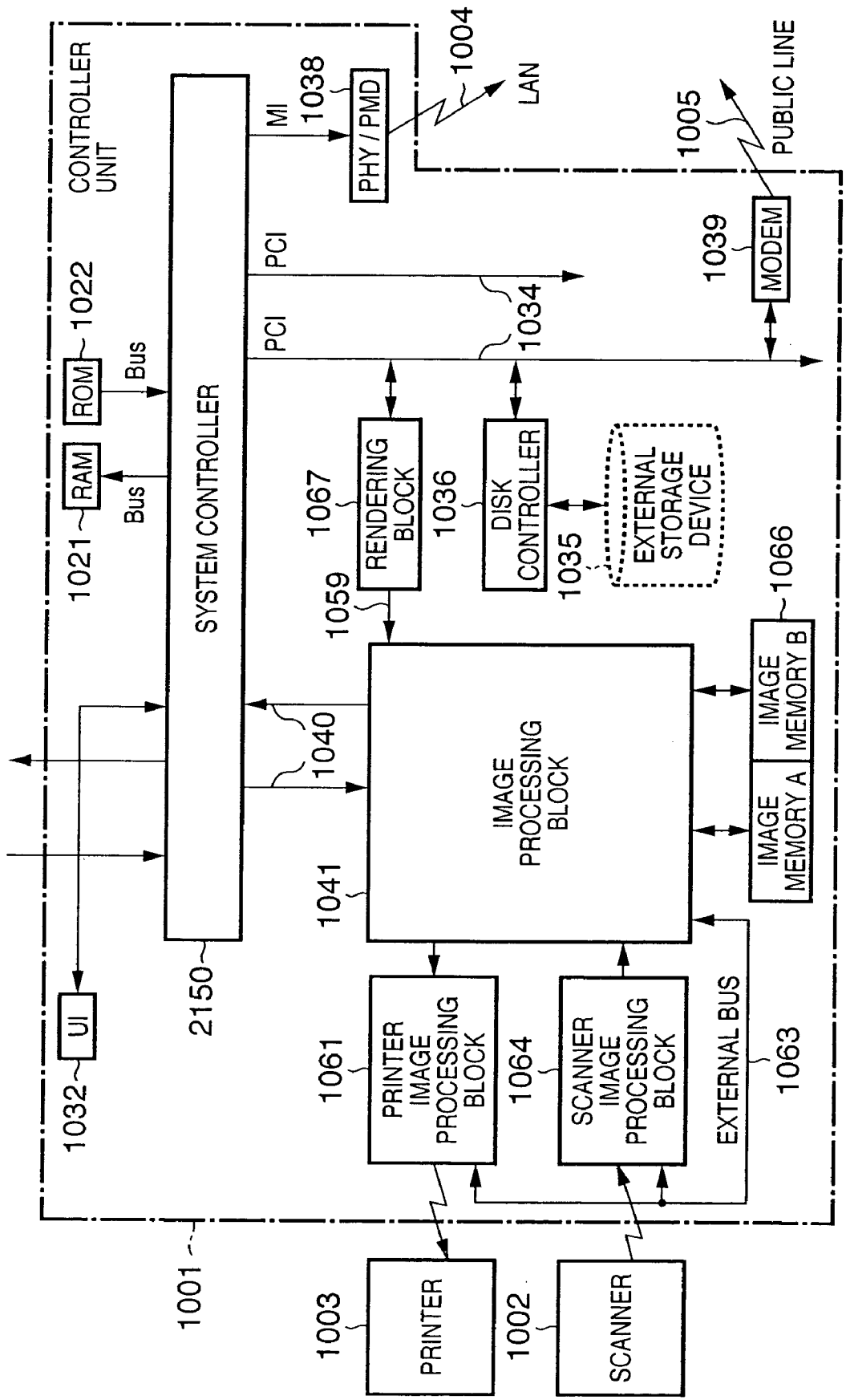
FIG. 13 is a block diagram showing the arrangement of the overall image processing apparatus according to the first embodiment of the present invention.

FIG. 13 is a block diagram showing the arrangement of the overall image processing apparatus according to the first embodiment of the present invention. Referring to FIG. 13, a controller unit 1001 is connected to a scanner 1002 as an image input device and a printer 1003 as an image output device, and also to a LAN 1004 or public line (WAN) 1005, so as to input/output image information and device information, and to render PDL data to an image.

[Overview of System Control Block]

Figure 14:
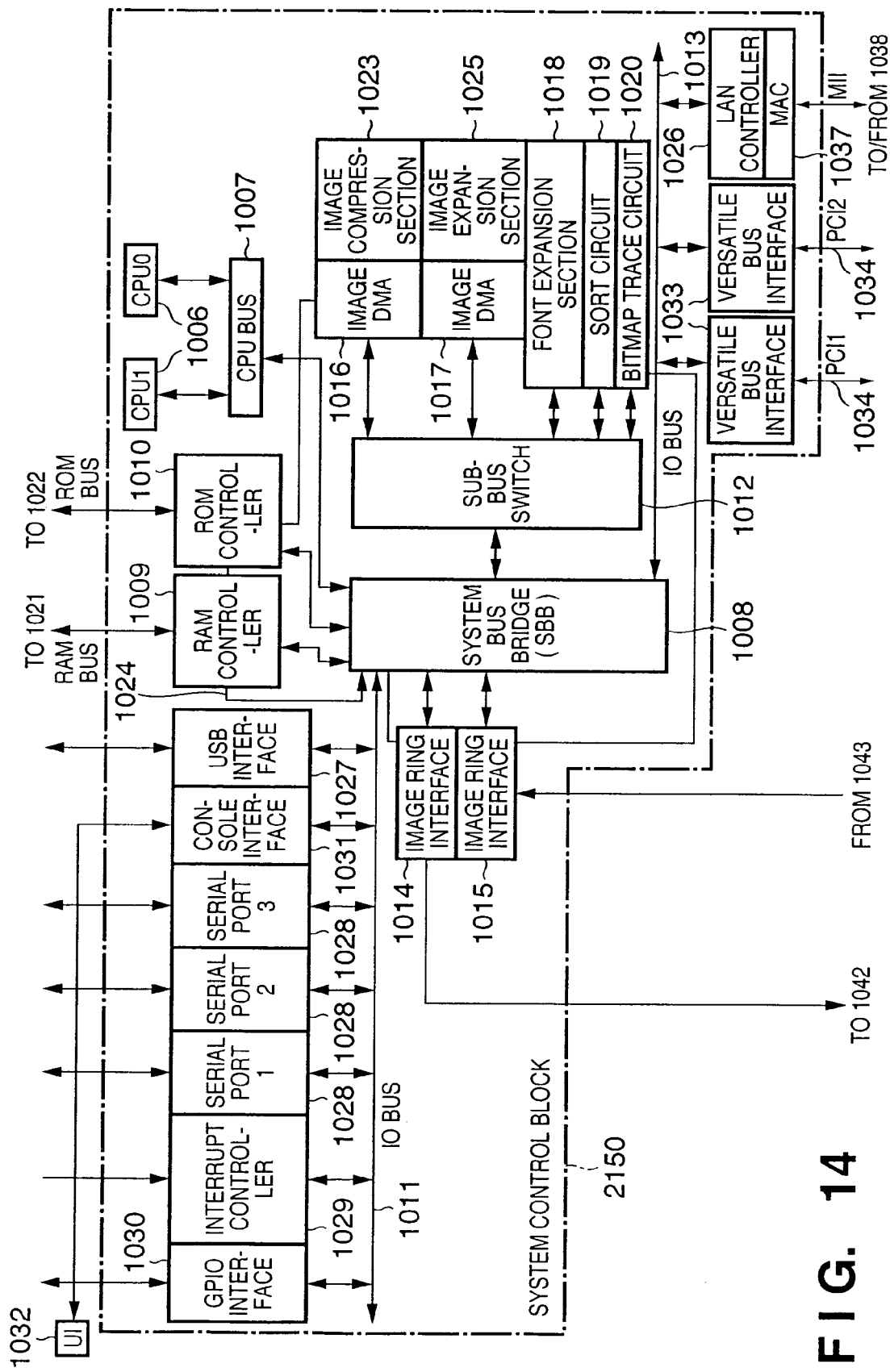
FIG. 14 is a block diagram showing the detailed arrangement of a system control block 2150 in the controller unit 1001.

FIG. 14 is a block diagram showing the detailed arrangement of a system control block 2150 in the controller unit 1001. Referring to FIG. 14, CPUs 1006 are processing blocks for controlling the entire system. In the example of this embodiment, two CPUs are used. These CPUs 1006 are connected to a common CPU bus 1007, and also to a system bus bridge 1008.

The system bus bridge 1008 serves as a bus switch, to which a CPU bus 1007, RAM controller 1009, ROM controller 1010, IO bus 1011, sub-bus switch 1012, IO bus 1013, and image ring interfaces 1014 and 1015 are connected.

The sub-bus switch 1012 serves as a second bus switch, to which image DMAs 1016 and 1017, font expansion section 1018, sort circuit 1019, and bitmap trace circuit 1020 are connected. The sub-bus switch 1012 arbitrates memory access requests output from these image DMAs, and connects them to the system bus bridge 1008.

A RAM 1021 serves as a system work memory required to operate the CPUs 1006 and also as an image memory for temporarily storing image data. The RAM 1021 is controlled by the RAM controller 1009. In the example of this embodiment, a direct RDRAM is adopted. A ROM 1022 is a boot ROM, which stores a boot program of the system. The ROM 1022 is controlled by the ROM controller 1010.

The image DMA 1016 is connected to an image compression section 1023. The image DMA 1016 controls the image compression section 1023 on the basis of information set via a register access ring 1024 to read out non-compressed data on the RAM 1021, to compress the readout data, and to write back the compressed data. In the example of this embodiment, JPEG is adopted as a compression algorithm.

The image DMA 1017 is connected to an image expansion section 1025. The image DMA 1017 controls the image expansion section 1025 on the basis of information set via the register access ring 1024 to read out compressed data on the RAM 1021, to expand the readout data, and to write back the expanded data. In the example of this embodiment, JPEG is adopted as an expansion algorithm.

The font expansion section 1018 expands compressed font data stored in the ROM 1022 or RAM 1021 on the basis of font codes contained in PDL data which is externally transferred via a LAN controller 1026 and the like. In the example of this embodiment, an FBE algorithm is adopted.

The sort circuit 1019 sorts display list objects generated during the rendering process of PDL data. The bitmap trace circuit 1023 extracts edge information from bitmap data.

The IO bus 1011 is a kind of internal IO buses. To the IO bus 1011, a controller of a USB bus as a standard bus, a USB interface 1027, (versatile) serial port 1028, interrupt controller 1029, and GPIO interface 1030 are connected. The IO bus 1011 includes a bus arbiter (not shown).

A console interface (I/F) 1031 interfaces with a console (UI) 1032, and outputs image data to be displayed on the console 1032 to it. Also, the console interface 1031 transfers information input at the console 1032 by the user of this system to the CPUs 1006.

The IO bus 1013 is a kind of internal IO buses. To the IO bus 1013, versatile bus interfaces 1033 and the LAN controller 1026 are connected. The IO bus 1013 includes a bus arbiter (not shown). The versatile bus interfaces 1033 serve as a bus bridge which includes two identical bus interfaces and supports a standard IO bus. In the example of this embodiment, PCI buses 1034 are adopted.

An external storage device (HDD) 1035 comprises a hard disk drive, and stores system software, image data, page information and job information corresponding to each image data, and the like. The HDD 1035 is connected to one PCI bus 1034 via a disk controller 1036. The LAN controller 1026 is connected to the LAN 1004 via a MAC circuit 1037 and PHY/PMD circuit 1038 to input/output information. A modem 1039 is connected to the public line 1005 to input/output information.

[Overview of Image Processing Block]

Figure 15:
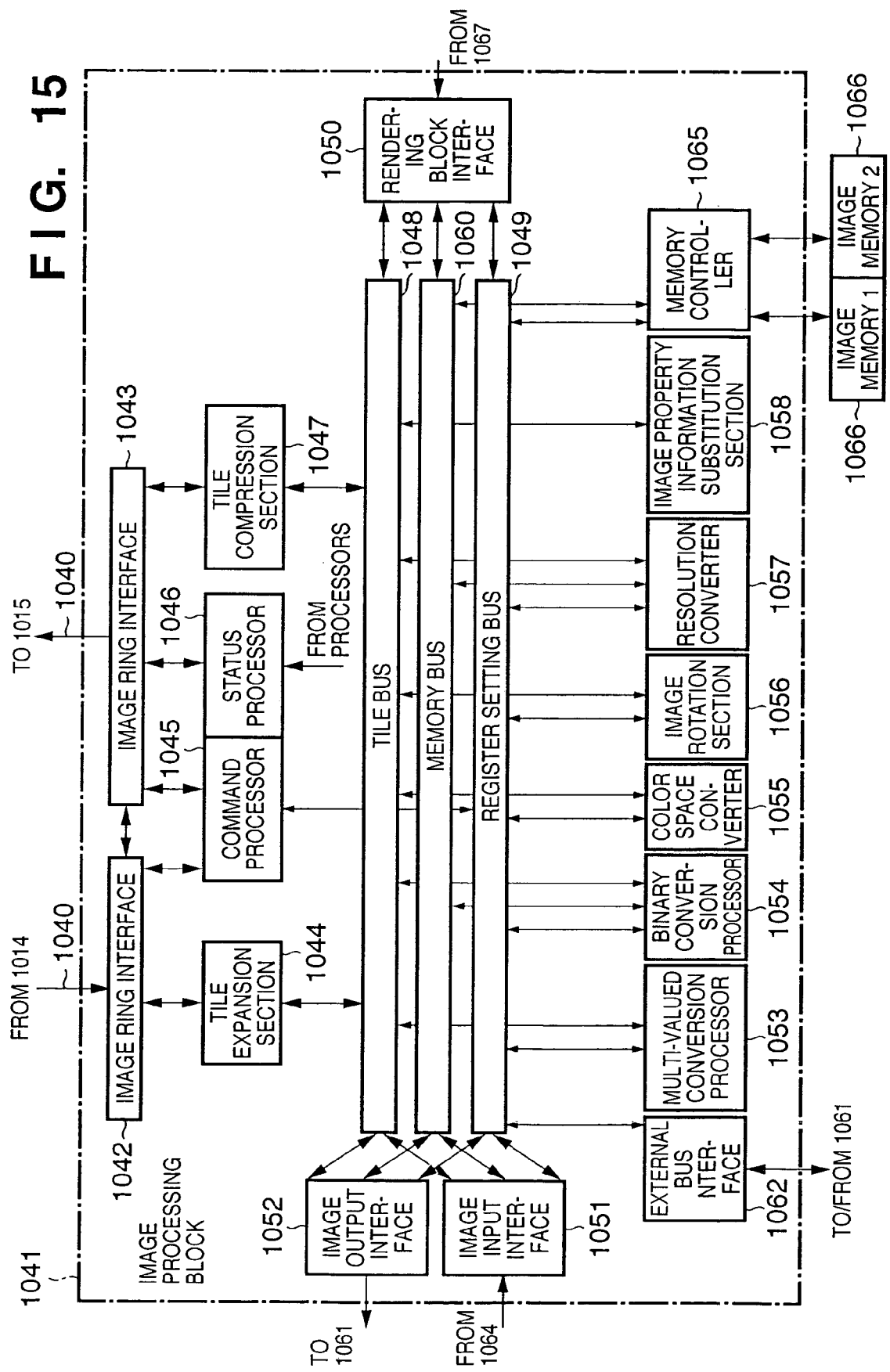
FIG. 15 is a block diagram showing the detailed arrangement of an image processing block 1041 in the controller unit 1001.

FIG. 15 is a block diagram showing the detailed arrangement of an image processing block 1041 in the controller unit 1001. Referring to FIG. 15, image rings 1040 comprise a combination of a pair of one-way connection routes. The image rings 1040 are connected to a tile expansion section 1044, command processor 1045, status processor 1046, and tile compression section 1047 via image ring interfaces 1042 and 1043 in the image processing block 1041.

The tile expansion section 1044 serves as a bus bridge, which is connected to a tile bus 1048 in addition to the image ring interface 1042, expands compressed image data input from the image ring 1040, and transfers expanded image data onto the tile bus 1048. The tile bus segments image data for one page into unit blocks (to be referred to as "tiles" hereinafter) each having a predetermined size, and makes a data process and transfer for respective tiles. In the example of this embodiment, JPEG is adopted as an expansion algorithm for multi-valued image data, and PackBits is adopted as that for binary image data.

The tile expansion section 1047 serves as a bus bridge which is connected to the tile bus 1048 in addition to the image ring interface 1043, compresses image data before compression input from the tile bus 1046, and transfers the compressed data onto the image ring 1040. In the example of this embodiment, JPEG is adopted as a compression algorithm for multi-valued image data, and PackBits is adopted as that for binary image data.

The command processor 1045 is connected to a register setting bus 1049 in addition to the image ring interface 1043, and writes a register setting request, which is issued by each CPU 1006 and is input via the image ring 1040, in a corresponding block connected to the register setting bus 1049. Also, the command processor 1045 reads out information from a corresponding register via the register setting bus 1049 on the basis of a register read request issued by each CPU 1006, and transfers the readout information to the image ring interface 1043.

The status processor 1046 monitors information of respective image processing blocks, generates an interrupt packet used to issue an interrupt to each CPU 1006, and outputs the packet to the image ring interface 1043. The following functional blocks are connected to the tile bus 1048 in addition to the aforementioned blocks.

That is, a rendering unit interface 1050, image input interface 1051, image output interface 1052, multi-value conversion processor 1053, binary conversion processor 1054, color space converter 1055, image rotation section 1056, resolution converter 1057, and image property information substitution section 1058 are connected. Also, the tile bus 1048 in FIG. 48 includes a bus controller.

The rendering unit interface 1050 receives a bitmap image generated by a rendering block 1067 (to be described later). The rendering block 1067 and rendering unit interface 1050 are connected via a general video signal 1059. The rendering unit interface 1050 has connections to a memory bus 1060 and the register setting bus 1049 in addition to the tile bus 1048. The rendering unit interface 1050 performs structure conversion of an input raster image to a tile image by a predetermined method set via the register setting bus 1049, synchronizes clocks at the same time, and outputs the converted data onto the tile bus 1048.

The image input interface 1051 receives scan image data from the scanner 1002, performs structure conversion of the scan image data into a tile image, changes its clock rate, and outputs the converted data to the image processing block 1041.

The image output interface 1052 receives tile image data from the tile bus 1048, performs structure conversion of the tile image data into a raster image, changes its clock rate, and outputs the converted data to a printer image processing block 1061.

The color space converter 1055 performs color space conversion of an image. The image rotation section 1056 rotates image data. The resolution converter 1057 converts the resolution of an image. Furthermore, the binary conversion processor 1054 converts a multi-valued (color & grayscale) image into a binary image. The multi-valued conversion processor 1053 converts a binary image into multi-valued data. Furthermore, the image property information substitution section 1058 converts received image property information into substitute property information, and transmits the converted information to another block.

An external bus interface 1062 is a bus bridge, which converts and outputs, onto an external bus 1063, a write/read request issued by each CPU 1006 via the image ring interfaces 1014, 1015, 1042, and 1043, command processor 1045, and register setting bus 1049. The external bus 1063 is connected to the printer image processing block 1061 and a scanner image processing block 1064 in this embodiment.

A memory controller 1065 is connected to memory buses 1059, and reads and writes image data, and makes refresh operation as needed with respect to image memories 1066 by pre-set address divisions in accordance with requests from respective image processing blocks. In the example of this embodiment, SDRAMs are used as image memories.

The scanner image processing block 1064 executes a correction process of image data scanned by the scanner 1002 as an image input device. The printer image processing block 1061 executes a correction process of image data to be output to a printer, and outputs the processing result to the printer 1003.

The rendering block 1067 renders a PDL record or intermediate display list to a bitmap image.

More specifically, in the image processing apparatus according to this embodiment, image data which contains first image property information for each predetermined unit is input via the scanner 1002 and image input I/F 1051. The input image data is segmented into tiles by the tile bus 1048, and the segmented image data for each tile is compressed by the tile compression section 1047. The compressed image data is stored in a memory such as the RAM 1021 or the like. In this case, if the size of the compressed image data is equal to or larger than a predetermined size (e.g., the storage capacity of the memory), image data excluding the first image property information is stored. The compressed image data stored in the memory is expanded by the tile expansion section 1044. On the other hand, second image property information is designated by the UI 1032 or each CPU 1006. When image data is output to the image output I/F 1052 so as to be printed by the printer 1003, the second image property information is set by the image property information substitution section 1058 as image property information of image data, which is expanded without including any first image property information.

In the image processing apparatus according to this embodiment, the data size of image data to be stored in the memory is counted by a data size counter 208 arranged in the tile compression section 1047, as will be described later. Each CPU 1006 or the like determines whether or not the data size of image data counted by the data size counter 208 has exceeded a predetermined size. If it is determined that the data size of image data has exceeded the predetermined size, a storage operation of the first image property information in the memory is stopped.

[Packet Format]

The data format in this embodiment will be described in detail below.

In the aforementioned controller unit 1001, image data, commands from the CPUs 1006, interrupt information from respective blocks, and the like are transferred in the form of packets. This embodiment uses three different types of packets, i.e., a data packet shown in FIG. 16, a command packet shown in FIG. 17, and an interrupt packet shown in FIG. 18.

Figure 16:
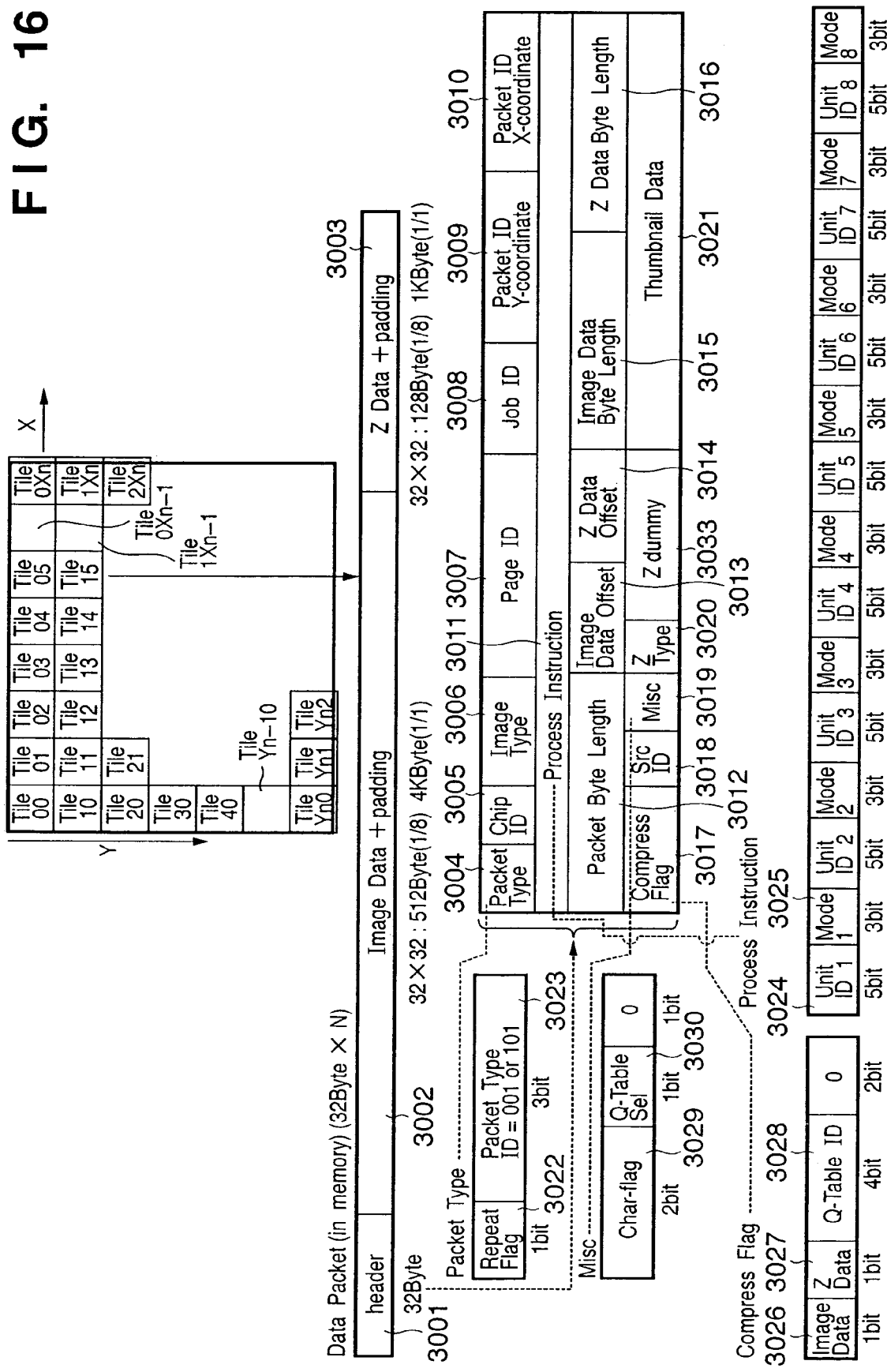
FIG. 16 is a schematic view showing the structure of a data packet used in the first embodiment.

FIG. 16 is a schematic view showing the structure of a data packet used in this embodiment. In this embodiment, image data to be processed is segmented into image data 3002 for each tile having 32 pixels×32 pixels. A packet formed by appending required header information (header) 3001, image property information (Z data) 3003, and the like to the image data 3002 for each tile is called a "data packet". Information contained in the header information 3001 will be described below.

As shown in FIG. 16, a packet is categorized into a data packet, command packet, or interrupt packet depending on the value of a Packet Type ID field 3023 in a Packet Type field 3004 in the header information 3001. In this embodiment, the Packet Type ID field 3023 consists of 3 bits, which are assigned as follows:

001b or 101b: data packet
010b: command packet
100b: interrupt packet

The Packet Type field 3004 contains a Repeat Flag 3022. When the image data and image property information 3003 in a given data packet and predetermined information values in the header information 3001 are the same as those in a data packet transmitted at an immediately preceding timing, "1" is set in the repeat flag 3022. In this case, only the header information 3001 is transferred as a packet.

A Chip ID field 3005 indicates the ID of a chip as a target to which a packet is to be transmitted. An Image Type field 3006 indicates the type of image data. In this embodiment, the type of image data is specified as follows using the upper 2 bits of the 8-bit Image Type field 3006:

00b: expresses image data for one pixel by 1 bit
01b: expresses image data for one pixel by 8 bits for one component 10b: expresses image data for one pixel by 8 bits for three components, i.e., a total of 24 bits 11b: expresses image data for one pixel by 8 bits for four components, i.e., a total of 32 bits A Page ID field 3007 indicates a packet that includes the data packet, and a Job ID field 3008 stores a job ID to be managed by software. The order of data packets arranged on a page is expressed by XnYn as a combination of a Y-tile coordinate (Packet ID Y-coordinate) 3009 and X-tile coordinate (Packet ID X-coordinate) 3010.

A Process Instruction field 3011 is set with left-aligned 8-bit instructions in the order in which they are processed, and each processing unit shifts the contents of the process instruction field to the left by 8 bits after processing. In this embodiment, the Process Instruction field 3011 stores eight pairs of Unit IDs 3024 and Modes 3025. The Unit ID 3024 designates each processing unit of an image processing block 1041, and the Mode 3025 designates an operation mode in that processing unit. In this way, one packet can be successively processed by a maximum of eight units.

A Packet Byte Length field 3012 indicates the total number of bytes of the packet. An Image Data Byte Length field 3015 indicates the number of bytes of image data, and a Z Data Byte Length field 3016 indicates the number of bytes of image property information. An Image Data Offset field 3013 and Z Data Offset field 3014 respectively indicate offset values from the head of the packet to the corresponding data.

The data packet can store either compressed or non-compressed image data and image property information. In the example of this embodiment, JPEG is adopted for multi-valued color image data (including multi-valued grayscale data), and PackBits is adopted for binary image data and image property information.

Whether image data and image property information are compressed or non-compressed by the aforementioned methods associated with image compression is determined as follows. That is, when the values of an Image data field 3026 and Z data field 3027 in a Compress Flag field 3017 are "1", image data and image property information are compressed data; when they are "0", image data and image property information are non-compressed data.

In the Compress Flag field 3017, a Q-Table ID field 3028 that stores the type of quantization table used upon executing a compression process by JPEG is prepared. If there are a plurality of quantization tables, quantization tables to be used are switched with reference to the values in the Q-Table ID field 3028 upon compressing and expanding data.

A Source ID field 3018 indicates a source from which image data and image property information are generated. A Z type field 3020 indicates the valid bit width in image property information, and image property information other than the bits indicated by the Z type field 3020 is determined as invalid information. If the value of the Z type field 3020 is zero, it indicates that all bits of input image property information are invalid.

A Z dummy field 3033 is set with a substitute value of image property information when a Compress Fail flag (to be described later) is set.

A Thumbnail Data field 3021 stores values (to be referred to as "thumbnail values" hereinafter) that represent image data in the data packet. In this embodiment, the Thumbnail Data field 3021 can store a maximum of four thumbnail values.

A Misc field 3019 stores information required other than the above pieces of information. In this embodiment, a Char-flag field 3029 and Q-Table Sel field 3030 are prepared. The Char-flag field 3029 stores a region signal to which the data packet belongs. The Q-Table Sel field 3030 stores information required to change a quantization table used upon compression and expansion by JPEG. Flags of both the Char-flag and Q-Table Sel fields are turned on/off depending on a count value obtained by counting the number of pixels having a predetermined image property indicated by Z data in the packet.

A Compress Fail flag 3032 is set when the data size after compression has exceeded a predetermined value.

Figure 17:
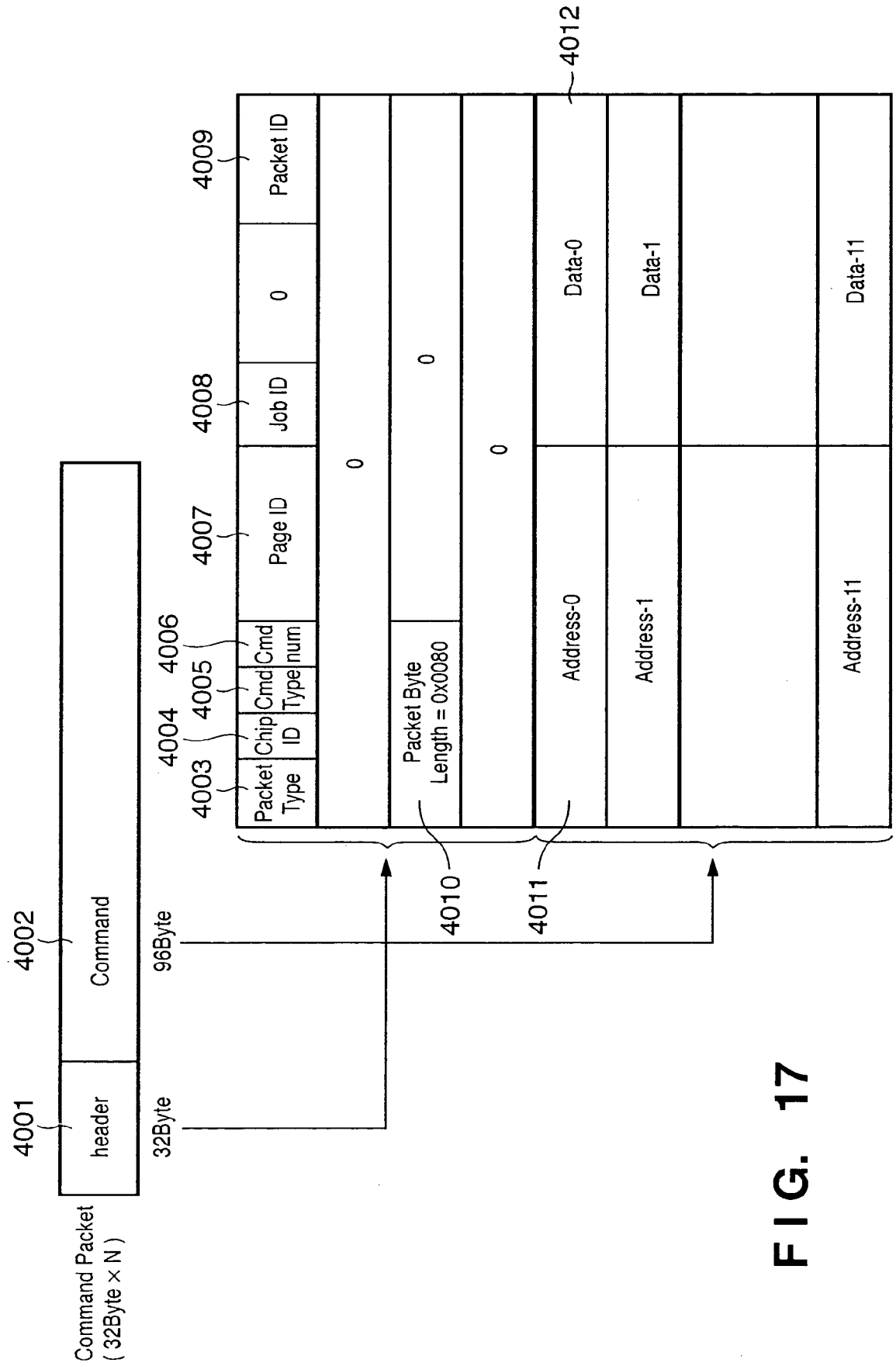
FIG. 17 is a schematic view showing the structure of a command packet used in the first embodiment.

FIG. 17 is a schematic view showing the structure of a command packet used in this embodiment. This packet format is used to access the register setting bus 1049. Using this packet, the CPUs 1006 can access the image memories 1066.

A Chip ID field 4004 stores the ID indicating the image processing block 1041 as the destination of a command packet. A Page ID field 4007 and Job ID field 4008 respectively store the page ID and job ID to be managed by software. Note that the value of a Packet ID field 4009 is expressed by one dimension. That is, only the X-coordinate of a data packet is used.

The value in a packet byte length field 4010 is fixed to 128 bytes. A packet data field 4002 can store a maximum of 12 commands each including a pair of address 4011 and data 4012. A header field 4001 includes a command type (Cmd Type) field 4005 indicating a write or read command, and a command number (Cmd num) field 4006.

Figure 18:
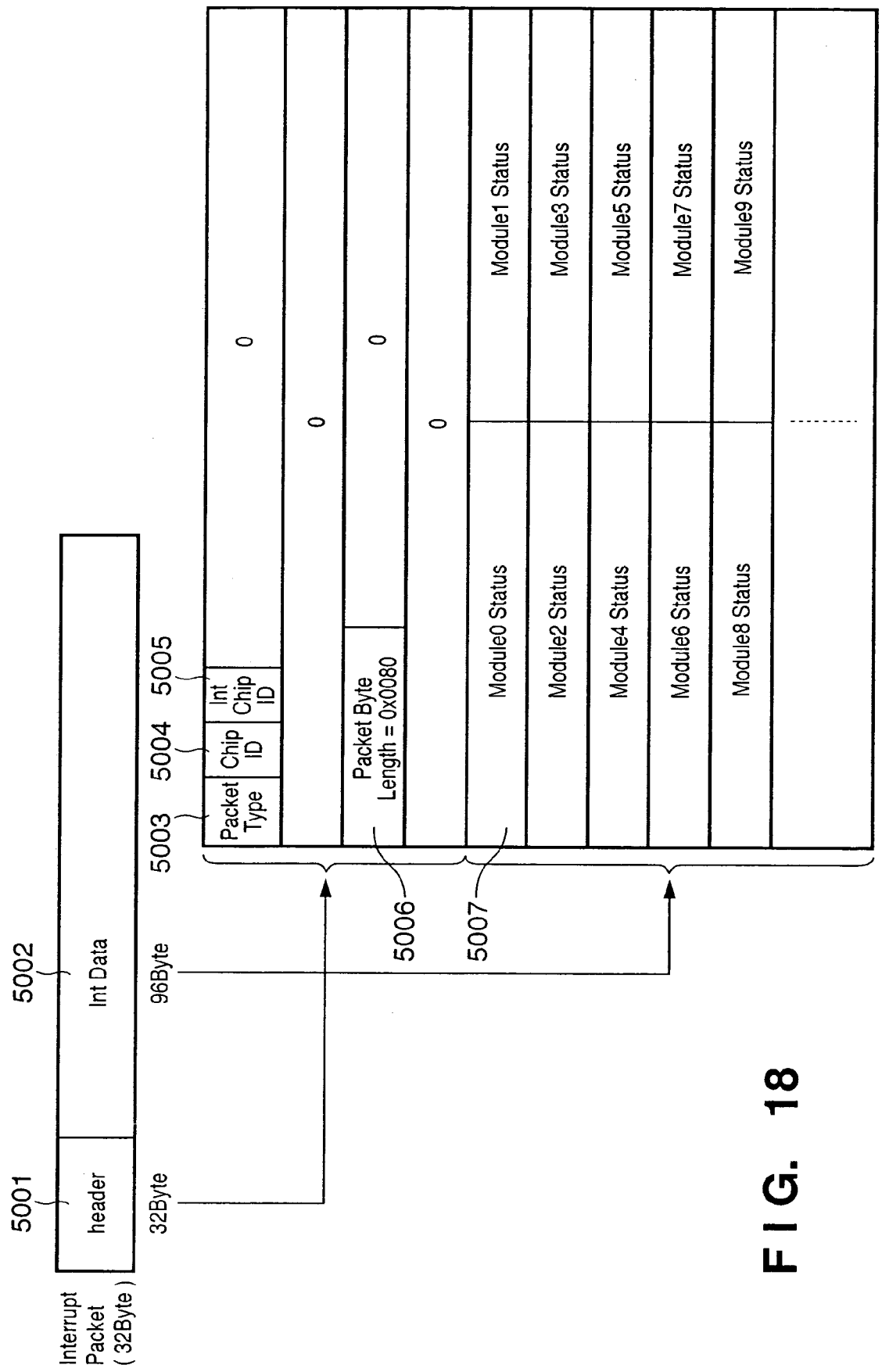
FIG. 18 is a schematic view showing the structure of an interrupt packet used in the first embodiment.

FIG. 18 is a schematic view showing the structure of an interrupt packet used in this embodiment. This packet format is used to send an interrupt from the image processing block 1041 to each CPU 1006. Once the status processor 1046 transmits an interrupt packet, it must not transmit the next interrupt packet until the next transmission is permitted. Note that the value in a packet byte length field 5006 is fixed to 128 bytes.

A packet data (Int Data) field 5002 stores status information (Module Status) 5007 of each internal module of the image processing block 1041. The status processor 1046 can collect a plurality of pieces of status information of respective modules in the image processing block 1041, and can send them to the system control block 2150 simultaneously.

A Chip ID field 5004 stores the ID indicating the system control block 2150 as the destination of an interrupt packet. An Int Chip ID field 5005 stores the ID indicating the image processing block 1041 as the source of an interrupt packet.

Figure 19:
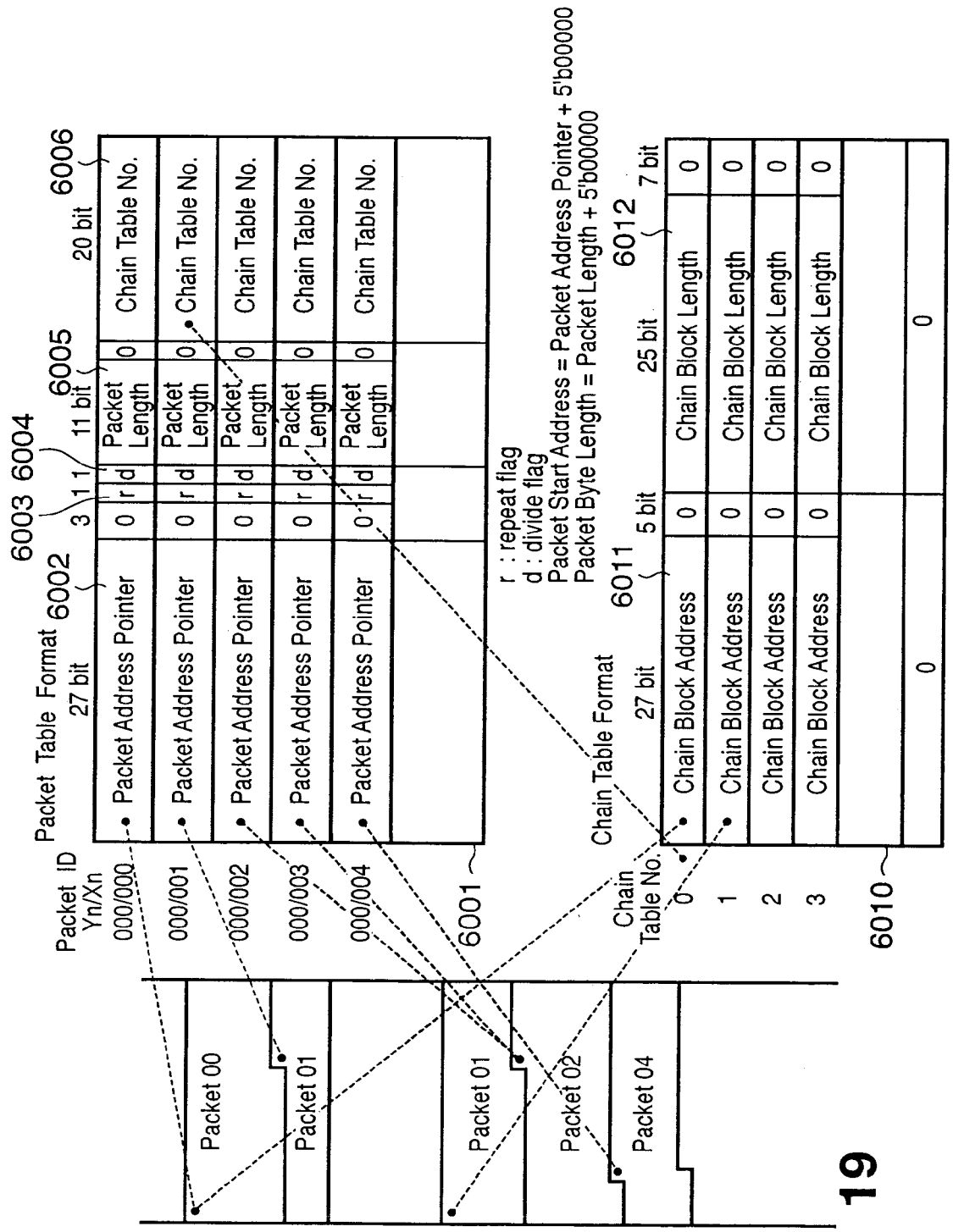
FIG. 19 is a schematic view showing the storage state of packet data in a RAM 1021.

When the packet data are stored in a memory, they are managed in the form of a packet table. FIG. 19 is a schematic view showing the storage state of packet data in the RAM 1021. The building components of a packet table 6001 are as follows. That is, when 5-bit "0"s are appended to respective table values, they express a packet start address 6002 and packet byte length 6005.

Packet Address Pointer (27 bits)+5$b$00000=Packet Start Address

Packet Length (11 bits)+5$b$00000=Packet Byte Length

Note that packet table entries 6001 are always arranged in the scan direction. That is, the packet table entries are arranged in the order of Yn/Xn=000/000, 000/001, 000/002, .... An entry of each packet table 6001 uniquely indicates one tile. The next entry of Yn/Xmax is Yn+1/X0.

When a packet in which the repeat flag 3002 in the header information 3001 is set is input, that packet is not written on the memory but the same packet address pointer and packet length as those in the first entry are stored in the next entry of the packet table. In this way, two table entries indicate one packet data. In this case, a repeat flag 6003 in the second table entry is set.

A packet can be discretely stored in the memory. In this case, such packet is managed using a chain table. Also, the packet table is allowed to divide packet data.

When a packet is divided into a plurality of segments, a divide flag 6004 is set, and a chain table No. 6006 of a chain block which stores the first segment of that packet is set. Note that the packet table 6001 and chain table 6010 are indivisible.

An entry of the chain table 6010 includes a chain block address 6011 and chain block length 6012, and the last entry of the table stores "0" as both the address and length.

In the image processing apparatus according to this embodiment, substitute information (second image property information) may be contained in header information set for each predetermined unit of image data. Also, substitute information (second image property information) may be a representative value of image property information in that image data.

[Overview of Scanner Image Processing Block]

Figure 20:
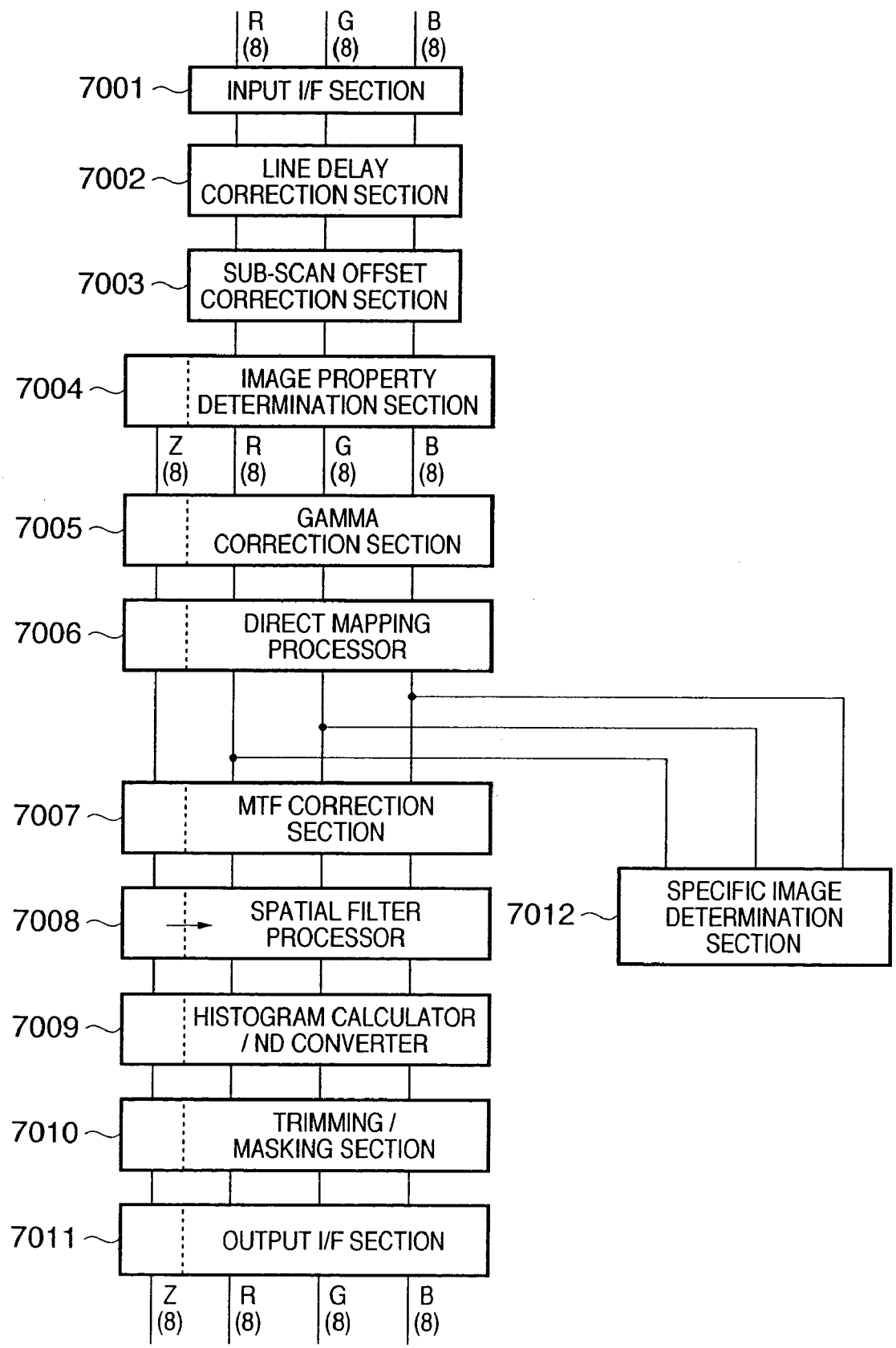
FIG. 20 is a block diagram showing internal blocks of a scanner image processing block 1064 shown in FIG. 13.

The scanner image processing block in this embodiment will be described in detail below. FIG. 20 shows internal blocks of the scanner image processing block 1064 shown in FIG. 12.

As shown in FIG. 20, an image (R, G, B) input from the scanner 2002 undergoes frequency conversion in synchronism with clocks of the image processing block in an input I/F section 7001. When the scanner 1002 comprises a 3-line sensor, since R, G, and B components have line delays, a line delay correction section 7002 corrects line delays of colors in such case. A sub-scan offset correction section 7003 corrects a sub-scan offset due to chromatic aberration or the like of an optical system.

An image property determination section 7004 performs edge detection or the like of image data on the basis of the type of document to determine the presence/absence of text, the presence/absence of colors, and the like in an input image, and outputs property information together with RGB image data.

A gamma correction section 7005 and input direct mapping processing section 7006 correct and output image data in accordance with the input characteristics of the scanner 1002. For example, the gamma correction section 7005 corrects the dynamic range for each color, and the direct mapping processing section 7006 corrects the tincture of the scanner.

The image output from the direct mapping processing section 7006 is input to an MTF correction section 7007 and specific image determination section 7012. The MTF correction section 7007 applies an arithmetic process for correcting the numerical aperture and chromatic aberration of the optical system in the main scan direction. The specific image determination section 7012 determines image data such as valuable securities and the like, which are prohibited from being printed by law, by, e.g., pattern matching.

A spatial filter processing section 7008 applies a spatial filter process such as edge emphasis, smoothing, and the like to an input image. This filter process is adaptively executed in accordance with the determination result of the aforementioned image property determination section 7004. For example, if it is determined that an input image corresponds to text, the image undergoes edge emphasis; if it is determined that the input image is a continuous tone image such as a photo or the like, the image undergoes smoothing.

A histogram calculator/ND converter 7009 calculates the histogram of the input image, and converts a chromatic RGB input image into an achromatic ND image. A trimming/masking section 7010 processes a print image region such as frame deletion, book frame deletion, and the like of input image data. Furthermore, an output I/F section 7011 makes frequency conversion of image data and property information from the scanner image processing clocks to be synchronized with system clocks, and outputs the converted image data and property information.

[Tile Compression Section]

Figure 2:
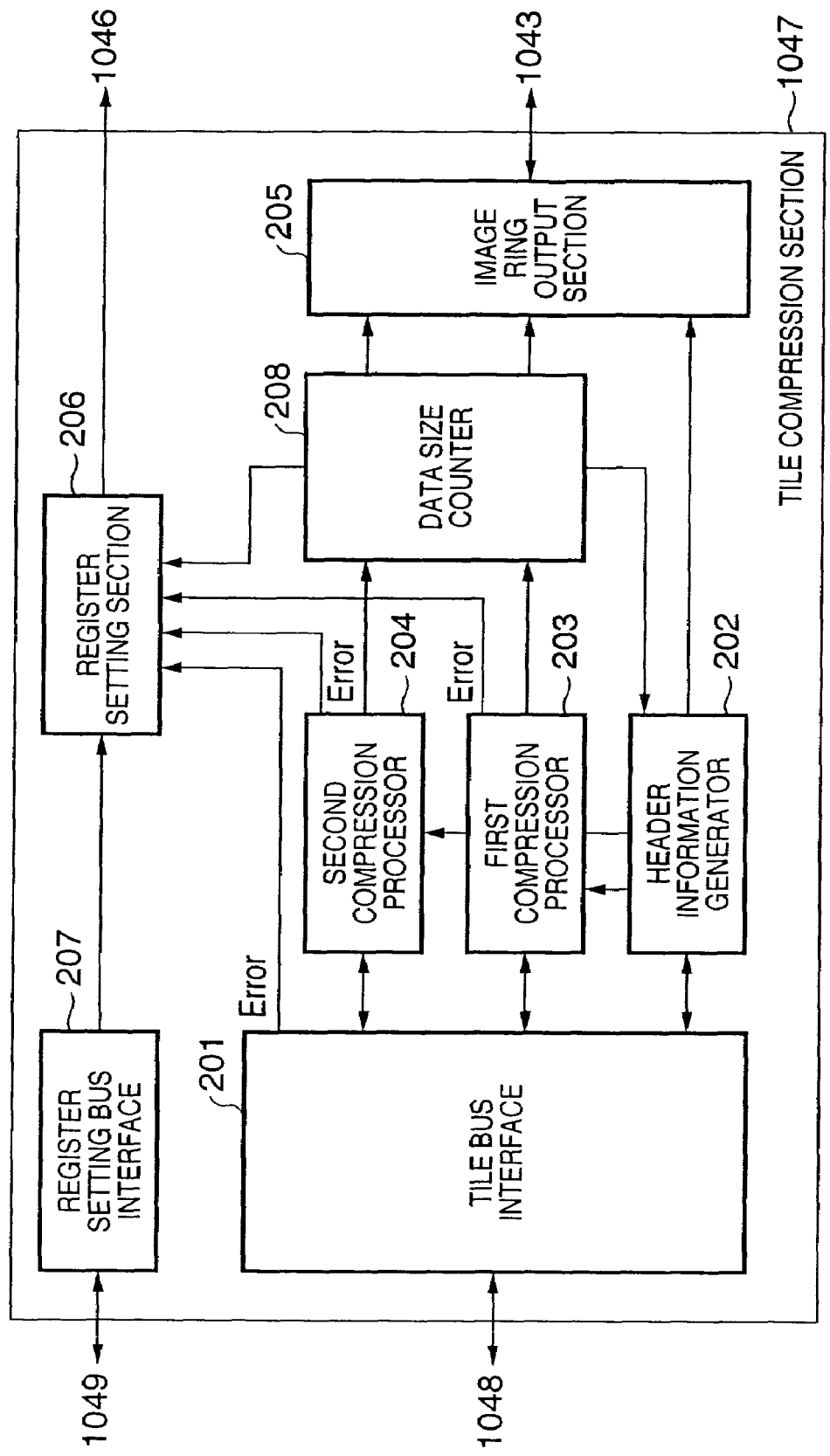
FIG. 2 is a block diagram showing the detailed internal arrangement of a tile compression section 1047 in a controller unit 1001 of an image processing apparatus of the first embodiment shown in FIG. 13.

FIG. 2 is a block diagram showing the detailed internal arrangement of the tile compression section 1047 in the controller unit 1001 of the image processing apparatus of this embodiment shown in FIG. 13.

Referring to FIG. 2, a tile bus interface 201 makes handshake with the tile bus 1048 to acquire header information, image data, and image property information input from the tile bus 1048, and outputs the acquired data to respective processing blocks connected to the subsequent stage.

The tile bus interface 201 analyzes the header information sent from the tile bus 1048. If inconsistency is found in the header information, the tile bus interface 201 outputs an interrupt signal corresponding to the inconsistency contents to a register setting section 206 (to be described later), and halts its operation until it receives a reset signal (not shown).

If no inconsistency is found in the header information, the tile bus interface 201 outputs the header information to a header information generator 202 connected to the subsequent stage. After that, the tile bus interface 201 acquires image data and image property information from the tile bus 1048, and outputs the image data or image property information to a first compression processor 203 (which executes a JPEG compression process in this embodiment) and second compression processor 204 (which executes a PackBits compression process in this embodiment) in accordance with the contents of the Image Type field 3006 in the header information.

More specifically, when the upper 2 bits of the Image Type field in the header information are 00b indicating 1-bit image data, the tile bus interface 201 outputs the image data to the second compression processor 204 without using the first compression processor 203.

On the other hand, when the upper 2 bits of the Image Type field are other than 00b, the tile bus interface 201 outputs the image data to the first compression processor 203, and outputs the image property information to the second compression processor 204. In this case, when the value of the Z type field 3020 is zero, since the input image property information is invalid, the tile bus interface 201 does not output the image property information to the second compression processor 204 to skip its compression process.

The header information generator 202 generates header information while the first and second compression processors 203 and 204 execute the compression processes of the image data and image property information. The header information generator 202 outputs information required for the compression processes from the stored header information to the first and second compression processors.

The first compression processor 203 represents a JPEG compression processor that implements JPEG compression in this embodiment. The first compression processor 203 executes a compression process of image data when image data has a multi-bit configuration. The first compression processor 203 has a buffer for storing the input image data for one tile, and holds image data of the packet processed at the immediately preceding timing until image data of the next packet is input, thus comparing image data input from the tile bus interface 201 with that stored in the buffer. The comparison result is output to an image ring output section 205 (to be described later), and is referred to upon generation of the repeat flag 3022.

When any operation abnormality is detected during the compression process in the first compression processor 203, the first compression processor 203 outputs an interrupt signal corresponding to the contents of the abnormal operation to the register setting section 206, and halts its operation until it receives a reset signal (not shown).

The second compression processor 204 executes a compression process based on a compression method free from any information loss, i.e., PackBits. The second compression processor 204 compresses, by PackBits, image data when image data of the packet input to the tile compression section has a 1-bit configuration, and compresses image property information when the image property information is available (i.e., the value of the Z type field 3020 is not zero).

As in the first compression processor 203, the second compression processor 204 has a buffer for storing input image property information for one packet, and holds 1-bit image data or image property information input at the immediately preceding timing, thus comparing image data or image property information input from the tile bus interface 201 with data stored in the buffer. The comparison result is output to the image ring output section 205 (to be described later), and is referred to upon generation of the repeat flag 3022.

When any operation abnormality is detected during the compression process in the second compression processor 204, the second compression processor 204 outputs an interrupt signal corresponding to the contents of the abnormal operation to the register setting section 206, and halts its operation until it receives a reset signal (not shown).

The image ring output section 205 acquires processing information, image data, and image property information from the header information generator 202, and first and second compression processors 203 and 204. The image ring output section 205 sets a predetermined value in the header information, then generates a data packet shown in FIG. 16, and outputs that packet to the image ring interface 1043.

Reference numeral 206 denotes a register setting section used to make setups that pertain to internal processes of the tile compression section 1047. In order to make the tile compression section 1047 execute a predetermined compression process, parameters such as a compression ratio, JPEG Q-Table, data limit value used in a data count process (to be described later), and the like must be set in the register setting section 206. These parameters are set by sending a command packet from the system control block 2150 to the command processor 1045 in the image processing block 1041, and then sending it from the command processor 1045 to the tile compression section 1047 via the register setting bus 1049.

The values set in the register setting section 206 are sent to the first and second compression processors 203 and 204, which execute predetermined processes with reference to these setting values.

Note that not only values are set in the register setting section 206 using a command packet, but also the setting values held by the register setting section 206 can be output to the system control block 2150 using a command packet.

Furthermore, the register setting section 206 has registers corresponding to interrupt signals input from the tile bus interface 201, and the first and second compression processors 203 and 204. Upon reception of an interrupt signal input from one of these blocks, the register setting section 206 sets a value of the corresponding register, and outputs an interrupt signal which informs generation of an interrupt and a status signal indicating the block that generated the interrupt to the status processor 1046.

A register setting bus interface 207 converts an address and setting values input from the register setting bus 1049 to the tile compression section 1047 into the format that the register setting section 206 can receive, and sends them to the register setting section 206. Note that the register setting bus interface 207 cannot only receive the register setting values from the register setting bus 1049, but also read out setting values corresponding to an address designated by the register setting bus 1049 and output the readout setting values onto the register setting bus 1049.

A data size counter 208 counts the data size of image data and image property information sent from the first and second compression processors 203 and 204 to the image ring output section 205, and outputs a flag signal to the header information generator 202 when the data size has exceeded a predetermined value.

[First Compression Processor]

Figure 1:
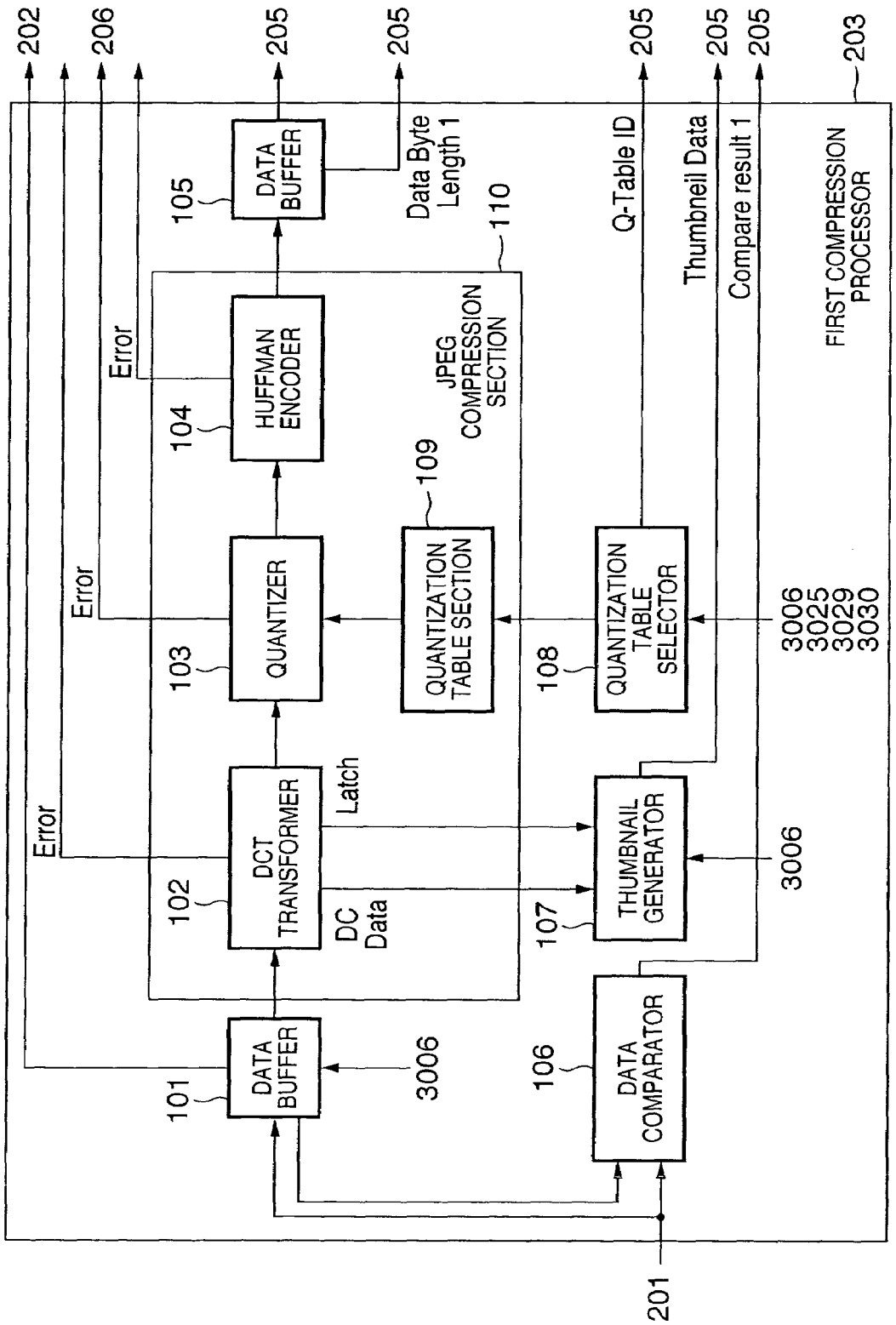
FIG. 1 is a block diagram showing the detailed arrangement of a first compression processor 203 in the first embodiment shown in FIG. 2.

FIG. 1 is a block diagram showing the detailed arrangement of the first compression processor 203 in FIG. 2. Note that this embodiment will explain a case wherein image data has an 8-, 24-, or 32-bit configuration, i.e., image data is to undergo the compression process in the first compression processor 203.

Referring to FIG. 1, a first data buffer 101 stores image data sent from the tile bus interface 201. When the stored image data reaches a predetermined size, the first data buffer 101 outputs the image data to a JPEG compression block 110 connected to the subsequent stage in accordance with a predetermined order. The first data buffer 101 receives the contents of the Image Type field 3006 in the header information from the header information generator 202, and the, order of image data to be output to the JPEG compression block 110 is controlled by the contents of the image type field 3006.

Figure 3:
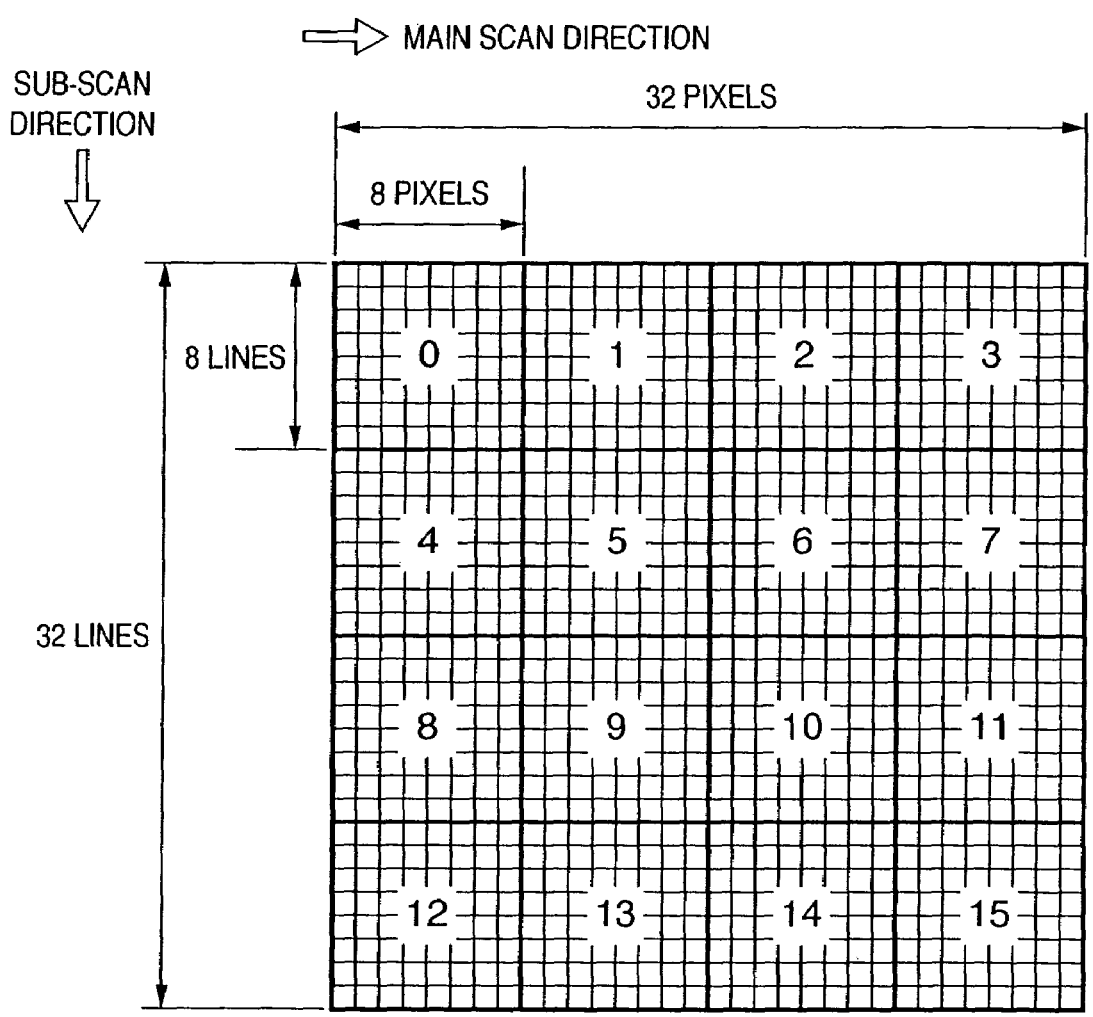
FIG. 3 is a schematic view for explaining the format of image data for one tile to be processed in the first embodiment.

The contents of the Image Type field 3006 and the order of image data to be input to the JPEG compression block 110 will be described below. FIG. 3 is a schematic view for explaining the configuration of image data for one tile to be processed in this embodiment. The image data shown in FIG. 3 is image data for one tile when the upper 2 bits of the Image Type field 3006 are 01b, i.e., image data which expresses image data for one pixel by 8 bits for one component is input from the tile bus interface 201, and represents image data which consists of 32 pixels (main scan direction)×32 pixels (sub-scan direction), i.e., 1024 pixels.

In order to output such image data to the JPEG compression block 110, these pixels are segmented into 16 blocks each consisting of 8 pixels (main scan direction)×8 pixels (sub-scan direction), i.e., 64 pixels, as one processing unit of the JPEG compression process. Respective blocks are output to the JPEG compression block 110. In FIG. 3, image data each for one pixel are bounded by the thin lines, segmented blocks as JPEG compression process units are bounded by the bold lines, and numbers 0 to 15 are assigned to these blocks in the order in which they are sent to the JPEG compression block 110.

Figure 4:
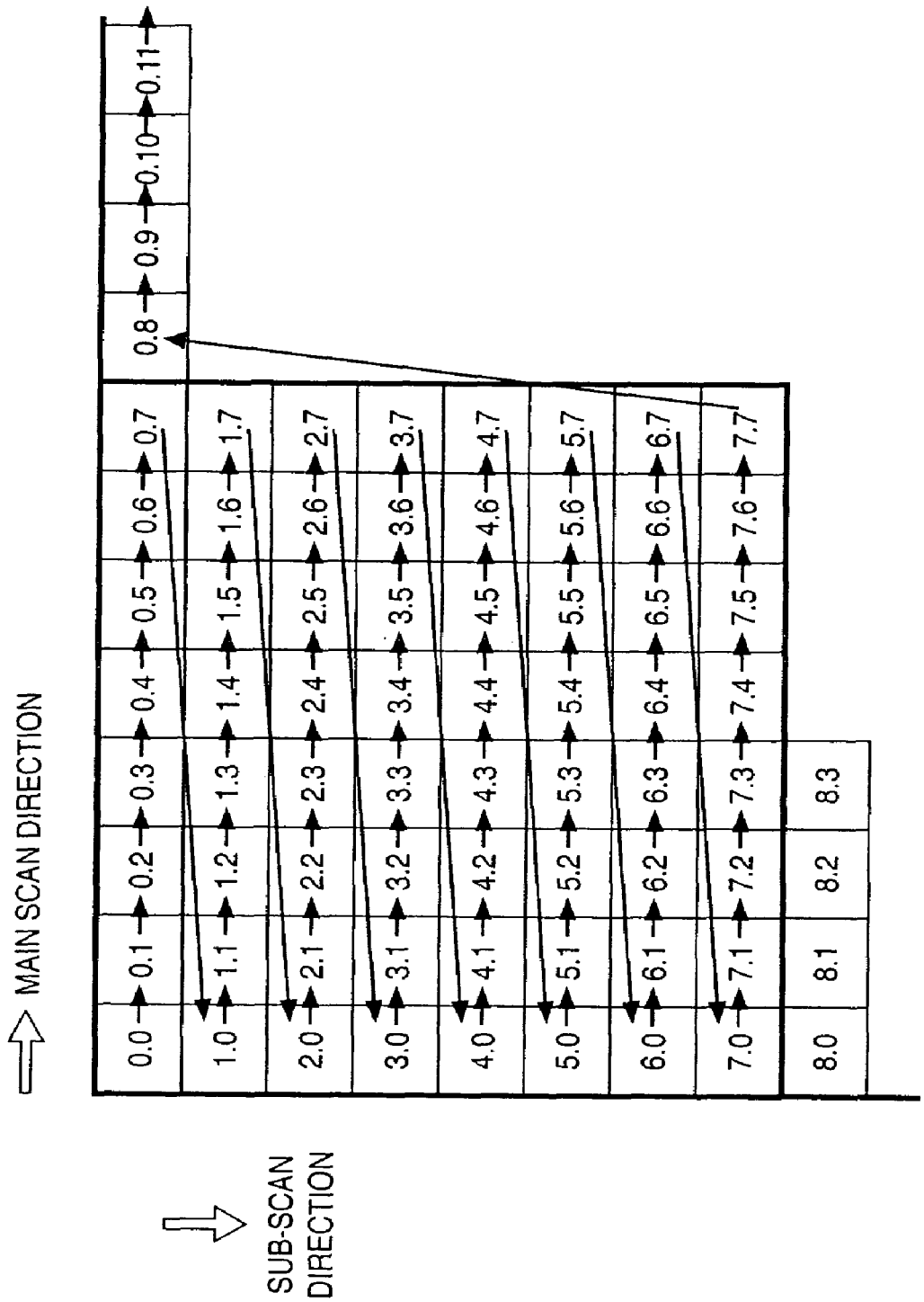
FIG. 4 is an enlarged view of pixels included in an upper left one of segmented blocks in the image data shown in FIG. 3.

FIG. 4 is an enlarged view of pixels contained in upper left block 0 of the segmented blocks in the image data shown in FIG. 3. As shown in FIG. 4, this block contains image data for 64 pixels, and numbers 0 to 7 are assigned to respective pixels in the main scan and sub-scan directions.

In the block shown in FIG. 4, pixel data are output to the JPEG compression block 110 in the order of (0, 1)→(0, 2)→ . . . →(0, 7) to start at upper left pixel data (0, 0), as indicated by arrows. After pixel data (0, 7), one line is shifted in the sub-scan direction and pixel data are then output in the order of (1, 0)→(1, 1)→ ... →(1, 7). When lower right pixel data (7, 7) is output by repeating the above operation, the image data output process of the block ends. After the image data of block 0 shown in FIG. 3 is output, image data are similarly output in the aforementioned order from upper left pixel data (0, 8) of block 1.

Figure 5:
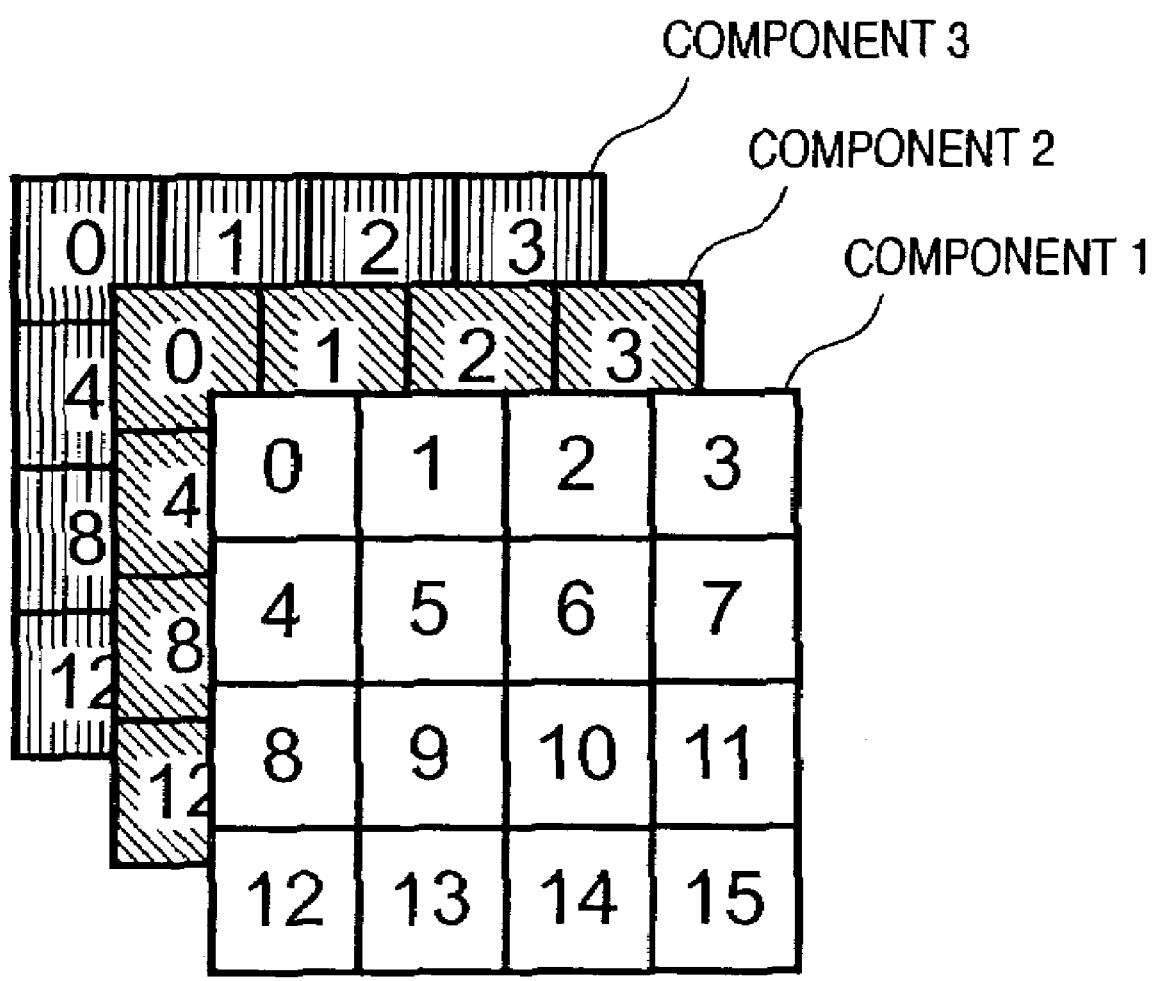
FIG. 5 is a second view for explaining image data for one tile to be processed in the first embodiment.

FIG. 5 is a second view for explaining image data for one tile to be processed in this embodiment. FIG. 5 shows image data for one tile when the upper 2 bits of the Image Type field 3006 are 10b, i.e., image data of a total of 24 bits (8 bits×three components per pixel) is input from the tile bus interface 201. Note that FIG. 5 illustrates image data using blocks shown in FIG. 3 as JPEG compression process units without illustrating any pixels. Also, FIG. 5 divisionally illustrates image data for respective components, i.e., components 1, 2, and 3 in place of pixels.

Figure 6:
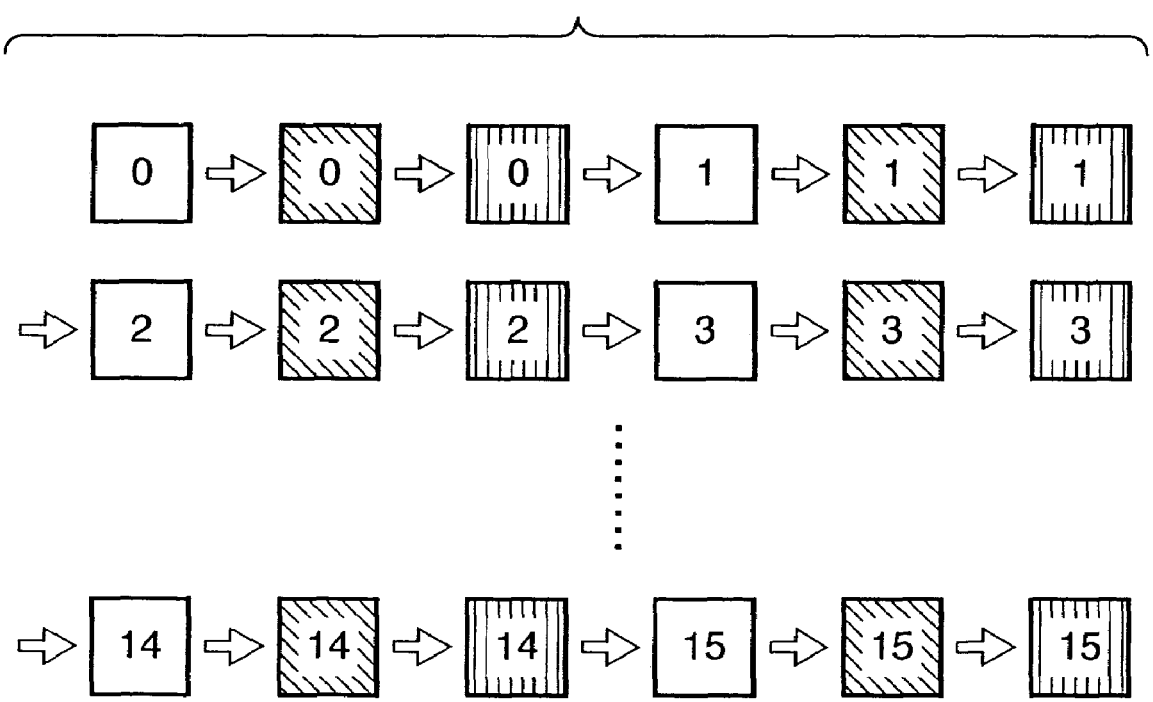
FIG. 6 shows an order in which image data shown in FIG. 5 are to be output to a JPEG compression block 110.

FIG. 6 shows the output order of image data shown in FIG. 5 to the JPEG compression block 110. In each block shown in FIG. 6, the output order of pixel data is the same as that in the aforementioned case explained using FIG. 4. In this embodiment, the first data buffer 101 outputs image data of component 1 of block 0 first. After all image data of component 1 of block 0 are output, image data of component 2 of block 0, and image data of component 3 of block 0 are output in turn. In this way, all image data of block 0 are output first.

After all the image data of block 0 are output, image data of component 1 of block 1 are then output, and image data of component 2 of block 1→component 3 of block 1→component 1 of block 2→ ... follow. Finally, upon completion of output of image data of component 1 of block 15→component 2 of block 15→component 3 of block 15, the output process of image data for one tile ends.

Note that the same process as in FIGS. 5 and 6 applies when the upper 2 bits of the Image Type field 3006 are 11b, i.e., image data of a total of 32 bits (8 bits×four components per pixel) is input from the tile bus interface 201. That is, image data of respective components of a predetermined block are output in the order of component 1→component 2→component 3→component 4, and image data of the next block are then output.

In this manner, in this embodiment, image data for one tile is segmented into blocks each consisting of 8 pixels (main scan direction)×8 pixels (sub-scan direction), and is input to and compressed by the JPEG compression block 110 for respective blocks. If each block has a plurality of image data (a plurality of components), after image data of respective components in one block are compressed, the next block is compressed.

As described above, in this embodiment, the JPEG compression block 110 compresses image data by JPEG, as shown in FIG. 1. Note that the JPEG compression block 110 further includes three processing blocks.

That is, a DCT transformer 102 receives 64 data from the data buffer 101, and transforms the input data into frequency components by computes their discrete cosine transforms (DCT). At this time, the DCT transformer 102 outputs a DC component generated by the discrete cosine transformation to a thumbnail generation block 107 (to be described later) together with a latch signal. The discrete cosine transformation is done every time 64 data are input, and a latch signal and DC component value are output to the thumbnail generation block 107 for each process. The DCT transformer outputs an error interrupt signal to the register setting section 206 when an error has occurred during computation of the discrete cosine transforms.

A quantizer 103 quantizes the frequency components output from the DCT transformer 102 using predetermined quantization values to generate quantized data. Note that the quantization values are input from a quantization table (to be described later), and the quantization values to be used are determined by analyzing the header information from the header information generator 202. When the quantization result becomes a value other than a predetermined value, the quantizer 103 outputs an error interrupt signal to the register setting section 206.

Furthermore, a Huffman encoder 104 generates encoded data by encoding the quantized data output from the quantizer 103 by predetermined coding, and outputs the encoded data to a second data buffer 105. The Huffman encoder 104 outputs an error interrupt signal upon reception of data which cannot be encoded.

The second data buffer 105 stores the encoded data encoded by the Huffman encoder 104. When encoded data for one tile is acquired from the Huffman encoder 104, the second data buffer 105 outputs the size of the stored encoded data as Data Byte Length1 to the image ring output section 205. The second data buffer 105 outputs the stored encoded data to the image ring output section 205 in accordance with a request from the image ring output section 205.

A data comparator 106 compares image data input from the tile bus interface 201 with that stored in the first data buffer 101. In this case, image data sent from the tile bus interface 201 is stored in the first data buffer 101, and is simultaneously compared by the data comparator 106 with image data which was stored in an area where the input image data is stored.

That is, the first data buffer 101 stores image data sent to the first compression processor 203 before a tile input from the tile bus interface 201. The data comparator 106 compares image data sent from the tile bus interface 201 with image data of the immediately preceding tile sent to the first compression processor 203 by the aforementioned operation.

Upon completion of comparison of image data for one tile by the data comparator 106, the data comparator 106 outputs a comparison result (Compare result 1) to the image ring output section 205.

On the other hand, the thumbnail generation block 107 acquires a DC component value in synchronism with a latch signal output from the DCT transformer 102, generates a thumbnail value for each tile by making an arithmetic operation and normalization, and outputs the thumbnail value to the image ring output section 205. Note that the thumbnail generation block 107 receives the Image Type 3006 from the header information generator 202. The thumbnail generation block 107 detects the order of DC component values sent from the DCT transformer 102 with reference to the Image Type 3006, and generates thumbnail values for respective components.

The generated thumbnail values are output to the image ring output section 205, which stores them in the Thumbnail Data field 3021 in the header information acquired from the header information generator 202 in a predetermined format. After that, the thumbnail data is output to an image ring interface 2104 as a data packet together with the image data compressed by the first compression processor 203 and the image property information compressed by the second compression processor 204.

A quantization table section 109 stores quantization values required to make quantization in the quantizer 103. The quantization table section 109 of this embodiment stores a plurality of quantization tables. A predetermined quantization table is selected from the quantization table section 109 in accordance with a select signal input from a quantization table selector 108 (to be described later), and quantization values are output to the quantizer 103.

The quantization table selector 108 outputs a quantization table select signal to the quantization table section 109 to make it select a predetermined one of the plurality of stored quantization tables.

The quantization table selector 108 receives the Image type 3006, Mode 3025, Char-flag 3029, and Q-Table Sel 3030 from the header information generator 202, and determines a quantization table to be used based on such header information. After the quantization table to be used is determined, the quantization table selector 108 outputs a quantization table select signal to the quantization table section 109 to select the determined quantization table, and outputs a Q-Table ID indicating the selected quantization table to the image ring output section 205.

[Second Compression Processor]

Figure 7:
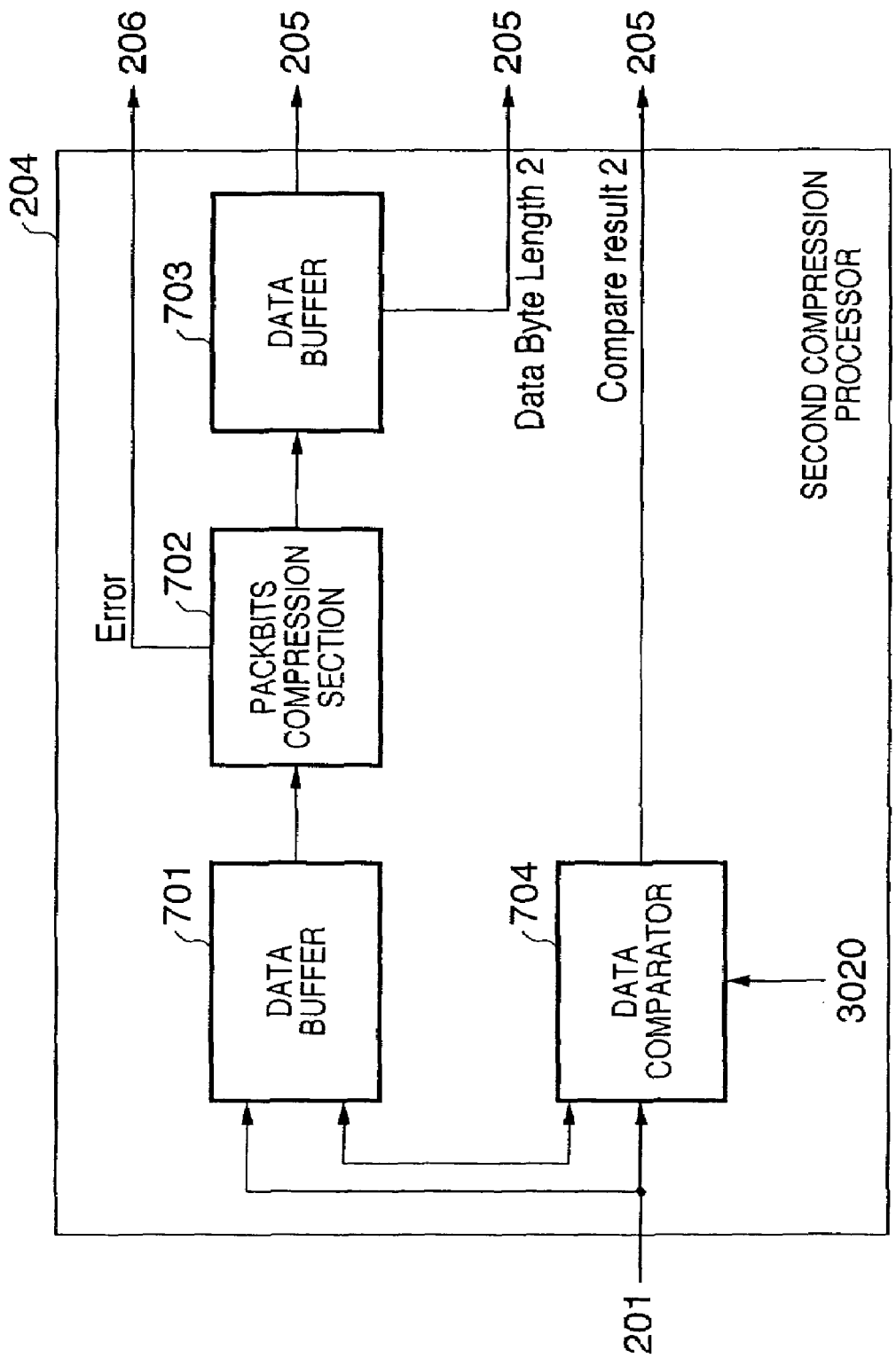
FIG. 7 is a block diagram showing the detailed arrangement of a second compression processor 204 in the first embodiment shown in FIG. 2.

FIG. 7 is a block diagram showing the detailed arrangement of the second compression processor 204 in this embodiment shown in FIG. 2. Referring to FIG. 7, a first data buffer 701 is used to store image property information sent from the tile bus interface 201. When the stored data reaches a predetermined size, the first data buffer 701 outputs data to a PackBits compression section 702 connected to the subsequent stage in accordance with a predetermined order. The PackBits compression section 702 compresses image property information stored in the first data buffer 701 by PackBits.

A second data buffer 703 is used to store compressed data which is compressed by the PackBits compression section 702. When compressed data for one tile is acquired from the PackBits compression section 702, the second data buffer 703 outputs the size of the stored data as Data Byte Length2 to the image ring output section 205. The second data buffer 703 outputs the stored compressed data to the image ring output section 205 in accordance with a request from the image ring output section 205.

A data comparator 704 compares image data input from the tile bus interface 201 with data stored in the first data buffer 701. That is, image data sent from the tile bus interface 201 is stored in the first data buffer 701, and is simultaneously compared by the data comparator 704 with image data which was stored in the first data buffer 701.

In this case, since the first data buffer 701 stores image property information sent to the second compression processor 204 before a tile input from the tile bus interface 201, the data comparator 704 compares image property information sent from the tile bus interface 201 with that for an immediately preceding tile in the second compression processor 204 by the aforementioned operation.

Upon completion of comparison of image property information for one tile by the data comparator 704, the data comparator 704 outputs a comparison result (Compare result 2) to the image ring output section 205.

[Control of Image Property Information by Data Size Count]

Figure 8:
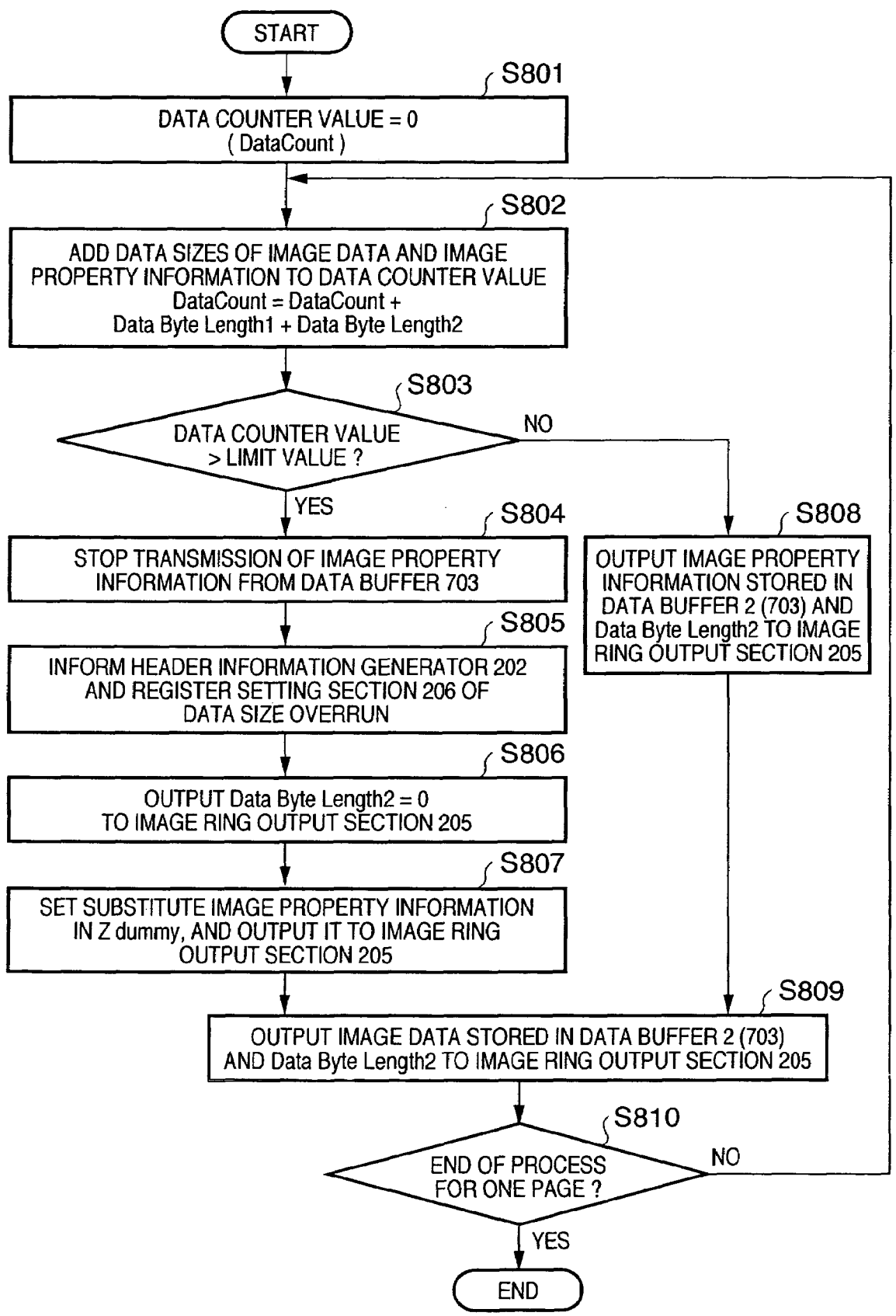
FIG. 8 is a flow chart for explaining the operation associated with a data count process of the tile compression section 1047 according to the first embodiment.

The operation sequence of the tile compression section 1047, which is shown in detail in the block diagram of FIG. 2, will be described below. FIG. 8 is a flow chart for explaining the operation associated with the data count process of the tile compression section 1047 according to this embodiment.

When the tile compression section 1047 starts a compression process, a data counter value (Data Count) is set to zero (step S801). Upon completion of the compression processes in the first and second compression processors 203 and 204, these blocks output the compressed data sizes (Data Byte Length1, Data Byte Length2) to the data size counter 208, which adds these sizes to the data counter value (Data Count) (step S802).

The data counter value (Data Count) is compared with a pre-set limit value t0 (step S803). If it is determined that the data counter value is larger than the limit value (YES in step S803), transmission of image property information from the second data buffer 703 is stopped (step S804). A Compress Fail signal is output to the header information generator 202 and register setting section 206 to inform them that the data size has overrun (step S805).

Upon reception of the Compress Fail signal, the register setting section 206 outputs an interrupt signal to the status processor 1046. If each CPU 1006 receives an interrupt packet from the status processor 1046 and determines that the interrupt generation source is the data size counter 208, it registers information indicating that the data size exceeded the limit value in page information of a page corresponding to that image data.

Subsequently, the data size counter 208 sets Data Byte Length2 to zero, and outputs it to the image ring output section 205 (step S806). The header information generator 202 refers to a data value of the first pixel of data stored in the first data buffer 701 in the second compression processor, and sets a substitute value of the image property information whose transmission is stopped in the Z dummy field 3033 (step S807).

On the other hand, if it is determined in step S803 that the data counter value does not exceed the limit value (NO in step S803), the image property information saved in the second data buffer 703 and Data Byte Length2 are directly output to the image ring output section 205 (step S808).

After the process in step S807 or S808, the data size counter 208 directly transmits image data saved in the second data buffer 703 and Data Byte Length1 to the image ring output section 205 (step S809). Furthermore, it is finally checked if the process for one page is complete (step S810). If it is determined that the process for one page is not complete yet (NO in step S810), the flow returns to step S802 to repeat the aforementioned process. On the other hand, if it is determined that the process for one page is complete (YES in step S810), the data count process ends.

As described above, the image data size upon execution of the compression process is controlled not to exceed a predetermined size to suppress recurrence of an image data read operation, and the image process which can minimize image deterioration can be executed by compensating for omitted image property information.

In the above embodiment, the substitute value of the image property information is set in the header. As a simple method, a register used to substitute image property information input to the second compression processor 204 by a fixed value may be prepared, and the image property information may be switched to the fixed value at the time of reception of the Compress Fail signal. In this case, it is determined that all pieces of image property information in one tile assume identical values, and Data Byte Length2=1. Therefore, the compressed data size can be suppressed to a constant value.

[Overview of Image Property Information]

FIG. 9 shows an example of image property information to be supplied to the printer image processing block 1061. In this embodiment, image property information is expressed by 4-bit data with different contents depending on supply sources (input sources) of image data. In FIG. 9, input source 0 represents image property information used when the input source is PDL data or the like which is transferred from a host via a LAN, and input source 1 represents image property information used when the input source is scan image data scanned by the scanner.

In the image property information in case of input source 0, bit0 is information (data type information) used to identify a data type, e.g., whether image data is a raster image or font data, and so forth. Also, bit1 is information (color determination information) used to identify a color determination result, e.g., grayscale data or color data. Furthermore, bit2 is information (image type information) used to identify an image type, e.g., text data or photo data. Note that bit3 is an empty bit.

On the other hand, in the image property information in case of input source 1, bit0 is page information used to identify a page before coupling upon printing two or more pages on one paper sheet. Also, bit1 is image type information used to identify an image type, i.e., whether image data is continuous tone data such as a photo or the like or image data formed by area gradation represented by a screen and dither matrix. Furthermore, bit2 is another image type information used to identify an image type, i.e., whether or not image data is data in a text region. Moreover, bit3 is operation mode information used to identify an operation mode of a printer engine.

Since the image property information contains region information associated with a layout like bit0 in this embodiment, image process setups for respective pages can be independently made upon executing a bookbinding process of a plurality of pages.

Note that the input source type of each image is stored in the external storage device 1035 (e.g., a hard disk) shown in FIG. 13 and is read out by each CPU 1006 from the hard disk at the beginning of the print process, thus applying an image process corresponding to the type.

As described above, in the image processing apparatus according to this embodiment, when the printer 1003 forms an image based on image data by designating substitute information (second image property information) used to set a page before coupling upon coupling image data of a plurality of pages on one page, and printing the coupled page, that substitute information (second image property information) can be added as the image property information of expanded image data.

[Overview of Image Property Information Substitution Block]

Figure 10:
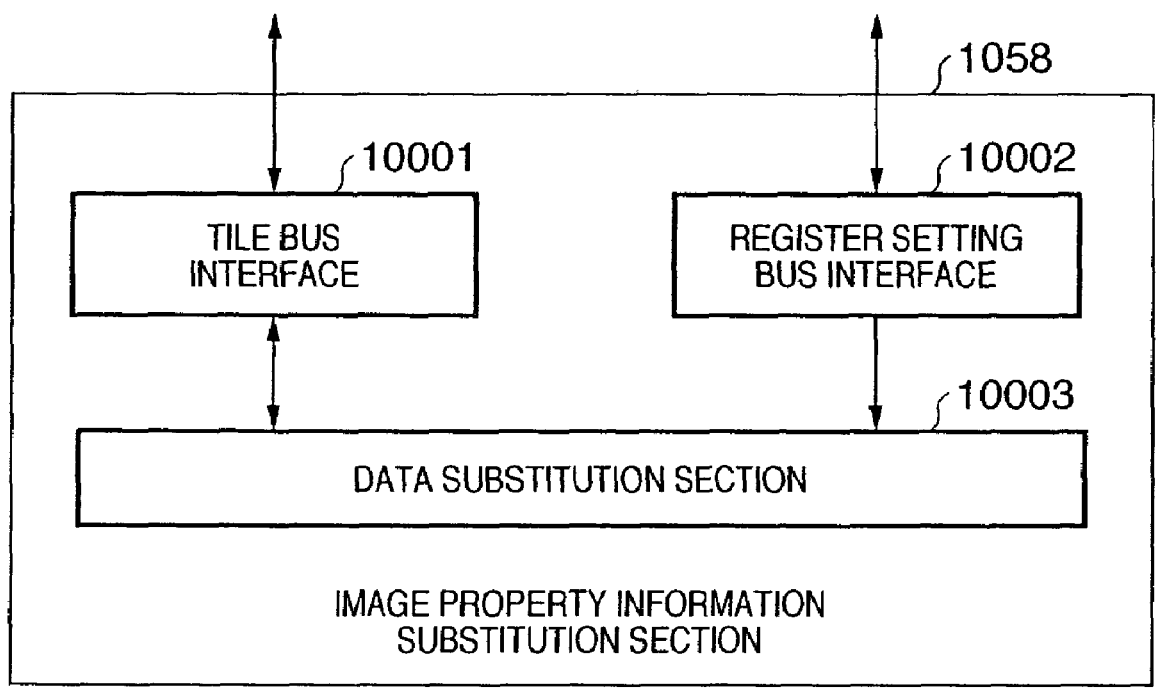
FIG. 10 is a block diagram showing the detailed arrangement of an image property information substitution section 1058 in the first embodiment.

FIG. 10 is a block diagram showing the detailed arrangement of the image property information substitution section 1058. Referring to FIG. 10, reference numeral 10001 denotes a tile bus interface; 10002, a register setting bus interface; and 10003, a data substitution section.

Figure 11:
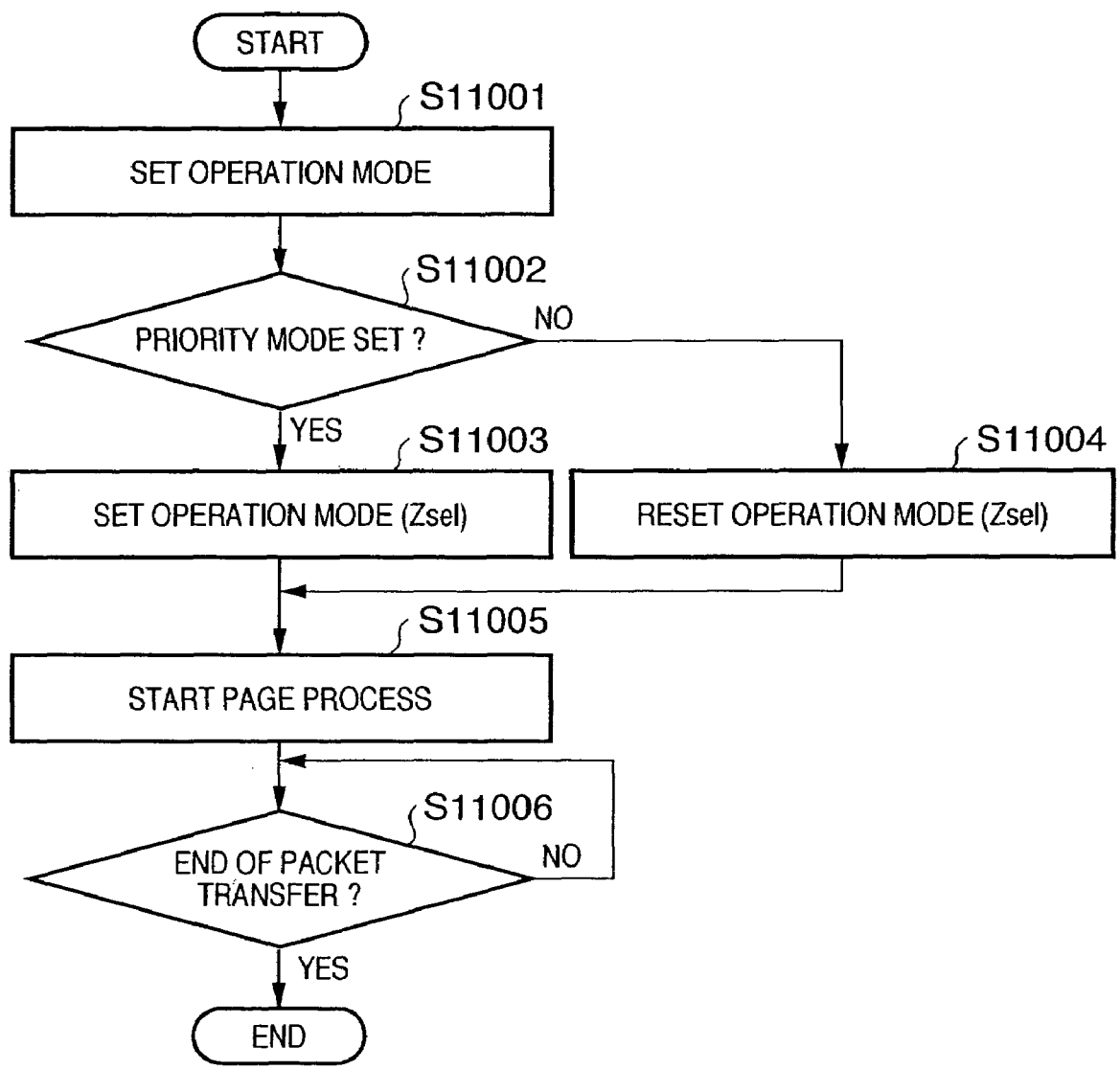
FIG. 11 is a flow chart for explaining the operation sequence of the image property information substitution section 1058 in the first embodiment.

FIG. 11 is a flow chart for explaining the operation sequence of the image property information substitution section 1058 in this embodiment. In this embodiment, an operation mode of the image property information substitution section 1058 is set before a page process operation starts (step S11001). Then, the set operation mode is confirmed at the beginning of the page process (step S11002).

If it is determined as a result of confirmation that the operation mode is set in a priority mode which prioritizes image property information substitution (YES in step S11002), a register Zsel which is prepared in the register setting bus interface 10002 and is used to select an image property information substitution method is set. Also, values to be fixed are set in respective bits of a register Zfix, which is prepared in the register setting bus interface 10002 and is used to fix image property information for respective bits (step S11003).

On the other hand, if it is determined that the operation mode prioritizes the image property information set by the data compression block (NO in step S11002), the operation mode Zsel is reset (step S11004).

After the process in step S11003 or S11004, the page process starts (step S11005). As a result, an image is input from the tile bus 1048 to the image property information substitution section 1058, and the tile bus interface 10001 extracts the image property information and the Z dummy value and Compress Fail flag in the header information and output them to the data substitution section 10003.

When Zsel is reset, the data substitution section 10003 refers to the Compress Fail flag. If the Compress Fail flag is set, the data substitution section 10003 sets the Z dummy value in the image property information, and transfers that information to the tile bus interface 10001.

The tile bus interface 10001 refers to the Compress Fail flag sent back from the data substitution section 10003. If the Compress Fail flag is set, the tile bus interface 10001 merges the image property information with the input image data, and sets the data length in Data Byte Length2 in the header information. Then, the tile bus interface 10001 transfers the image data to the image output interface 1052 via the tile bus 1048. Furthermore, the image data is transferred to the printer image processing block 1061.

With this process, even when image property information is omitted due to data size overrun upon data compression, image property information for each packet can be re-generated and transferred to the printer image processing block 1061, and an image process according to the image property can be executed.

In a sequence in which Zsel is reset in step S11004, image property information may be substituted by the Z dummy value from the middle of a page, and discontinuity upon switching image processes in the middle of the page may adversely influence an output image. In such case, a process set with Zsel is executed. When Zsel is set, each CPU 1006 confirms based on page information stored upon data transfer if a packet that has caused data size overrun is contained. If such packet is contained, image property information for each packet is substituted from the beginning of the page set with data size overrun, irrespective of the Compress Fail flag. In this case, the data substitution section 10003 substitutes image property information by Zfix in place of Z dummy.

Note that the aforementioned substitution process is repeated until all packets in the page are transferred (step S11006).

As described above, the data substitution section 10003 of this embodiment allows to output a preferred image. Also, a service mode, user mode, or the like, which is backed up by the CPU, may be prepared to allow a service person or user to set Zsel and Zfix, so that the user can arbitrarily set which of image properties is to be preferentially set according to his or her favor. In this way, the most preferred image output for the user can be obtained.

That is, in the image processing apparatus according to this embodiment, substitute information (second image property information) that the user can designate may be stored, and one of an operation mode which uses the stored substitute information as new image property information to be set by the image property information substitution section 1058 and an operation mode which uses substitute information (third image property information) contained in header information set for each predetermined unit of image data may be designated.

[Overview of Printer Image Processing Block]

The printer image processing block 1061 in the first embodiment of the present invention will be described in detail below. FIG. 21 is a block diagram showing the detailed arrangement of the printer image processing block 1061 according to this embodiment. R, G, and B or C, M, Y, and K image data output from the image processing block 1041 shown in FIG. 13 or the like are input to printer image processors 8001 and 8002 in the printer image processing block 1041. The printer image processors 8001 and 8002 respectively comprise image processing blocks for two colors, and respective blocks can operate in synchronism with respective printer engines in accordance with image requests from a tandem-engine printer (printer 1003 which comprises printer engines for respective colors.

Figure 22:
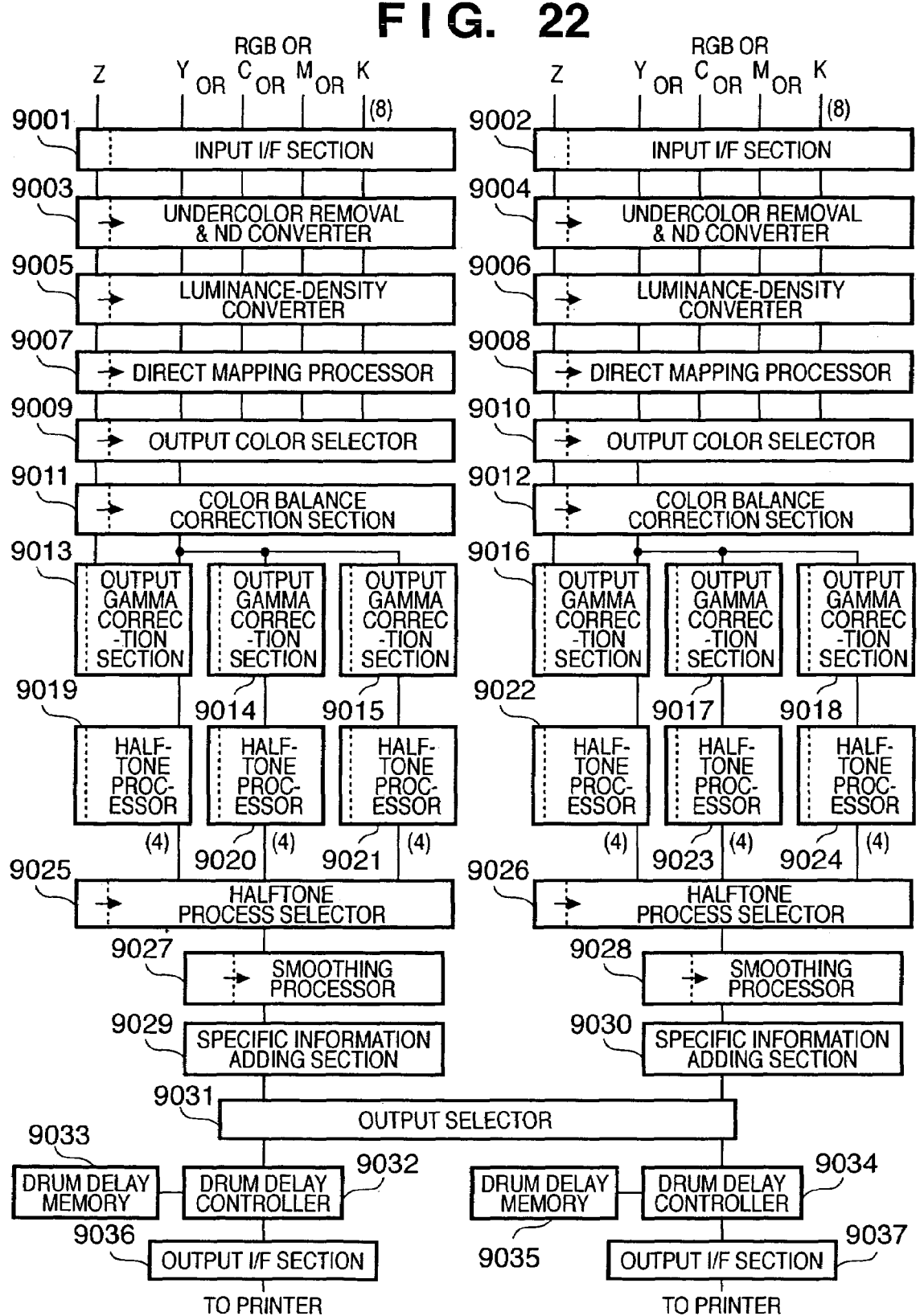
FIG. 22 is a block diagram showing the detailed arrangement in printer image processors 8001 and 8002.

FIG. 22 is a block diagram showing the detailed arrangement in the printer image processors 8001 and 8002. As shown in FIG. 22, the internal arrangement is roughly divided into two systems, which generate image data corresponding to printer engines for two colors.

Referring to FIG. 22, reference numerals 9001 and 9002 denote input I/F sections, which frequency-convert image data input from the system in synchronism with print image process clocks. Reference numerals 9003 and 9004 denote undercolor removal & ND converters, which remove the background color of input image data and convert chromatic R, G, and B data into achromatic ND data in accordance with image property information.

Reference numerals 9005 and 9006 denote luminance-density converters, which perform luminance-density conversion of input data in accordance with image property information. Reference numerals 9007 and 9008 denote direct mapping processors, which convert input R, G, and B data into C/M/Y/K color components of the printer engine. Reference numerals 9009 and 9010 denote output color selectors.

Reference numerals 9011 and 9012 denote color balance correction sections, which perform fine adjustment and the like of the tincture of an output image in accordance with image property information. Reference numerals 9013 to 9018 denote output gamma correction section, which correct the dynamic range and tone curve of an image to be output. In this embodiment, three different types of gamma correction (A to C) are simultaneously done per color to output data.

Reference numerals 9019 to 9024 denote halftone processors, which perform tone conversion of an output image by quantizing image data. In this embodiment, each 8-bit data input to the printer image processors 8001 and 8002 is converted into 4-bit data. As a halftone processing method, a screen process, error diffusion, and the like are prevalent. In this embodiment, each color data undergoes three different types of arbitrary halftone processes.

Reference numerals 9025 and 9026 denote halftone process selectors, which select optimal processing results from output images that have been processed by the three types of halftone processors in accordance with image property information. Reference numerals 9027 and 9028 denote smoothing processors, which perform a pattern matching process that eliminates shaggy of character edges and the like in accordance with image property information.

Reference numerals 9029 and 9030 denote specific information adding sections, which perform a process for superimposing image information that allows to specify an output device in output image data. Reference numeral 9031 denotes an output selector that can select a printer engine to which data processed by the two systems of image processors are to be output.

Reference numeral 9032 and 9034 denote drum delay controllers; and 9033 and 9035, drum delay memories. With the processes from the input I/F sections 9001 and 9002 to the output color selectors 9009 and 9010, image data output from the image processing block 1041 in FIG. 12 are processed by four image processors at the same time. The drum delay controllers 9032 and 9034 store image data which are output from the image processing block 1041 and are processed by the printer image processing block 1061 in the drum delay memories 9033 and 9035 until an output request from the printer 1003 is received. In this way, the image data can be output in synchronism with respective printer engines (printer 1003).

Note that reference numerals 9036 and 9037 denote output I/F sections, which perform frequency conversion required to output an image in synchronism with printer I/F clocks.

In the aforementioned embodiment, the printer image processing block 1061 which is compatible to the tandem-engine printer has been explained. However, the application range of the present invention is not limited to the aforementioned embodiment. For example, the image processing block may have an arrangement for a single engine, or one image processing block may comprise image processing blocks for four colors.

As described above, according to the present invention, appropriate image property information can be provided in accordance with the operation mode, and a more preferable image process can be realized by arbitrarily switching the priority of image property information to be added.

Second Embodiment

The second embodiment of the present invention will be described in detail hereinafter with reference to the accompanying drawings.

<Overview of Network System>

A schematic arrangement of a network system which includes an image processing apparatus according to the second embodiment is the same as that of the network system shown in FIG. 12 explained in the first embodiment.

Note that the arrangement of the system including the image processing apparatus according to each of the first and second embodiments, and the third embodiment and subsequent embodiments of the present invention are not limited to such specific arrangement, and various other arrangements may be adopted. Hence, the image processing apparatus according to each embodiment can provide a scanned image to another apparatus and can print out an image received from another apparatus in such systems with various arrangements.

The term "image" used in the following description may include text information, and the meaning of the term "image" includes a case wherein information which includes both image information and text information is called an image.

<Overview of Image Processing Apparatus>

The basic arrangement of the image processing apparatus according to the second embodiment is substantially the same as that of the image processing apparatus described using FIG. 13 in the first embodiment. That is, the controller unit 1001 is connected to the scanner 1002 as an image input device and the printer 1003 as an image output device, and also to the LAN 1004 or public line (WAN) 1005, so as to input/output image information and device information, and to execute a control process required to render PDL data to an image. Since the arrangement and operation of the system control block 2150 are the same as those explained using FIG. 14 in the first embodiment, a description thereof will be omitted.

<Overview of Image Processing Block 1041>

Figure 23:
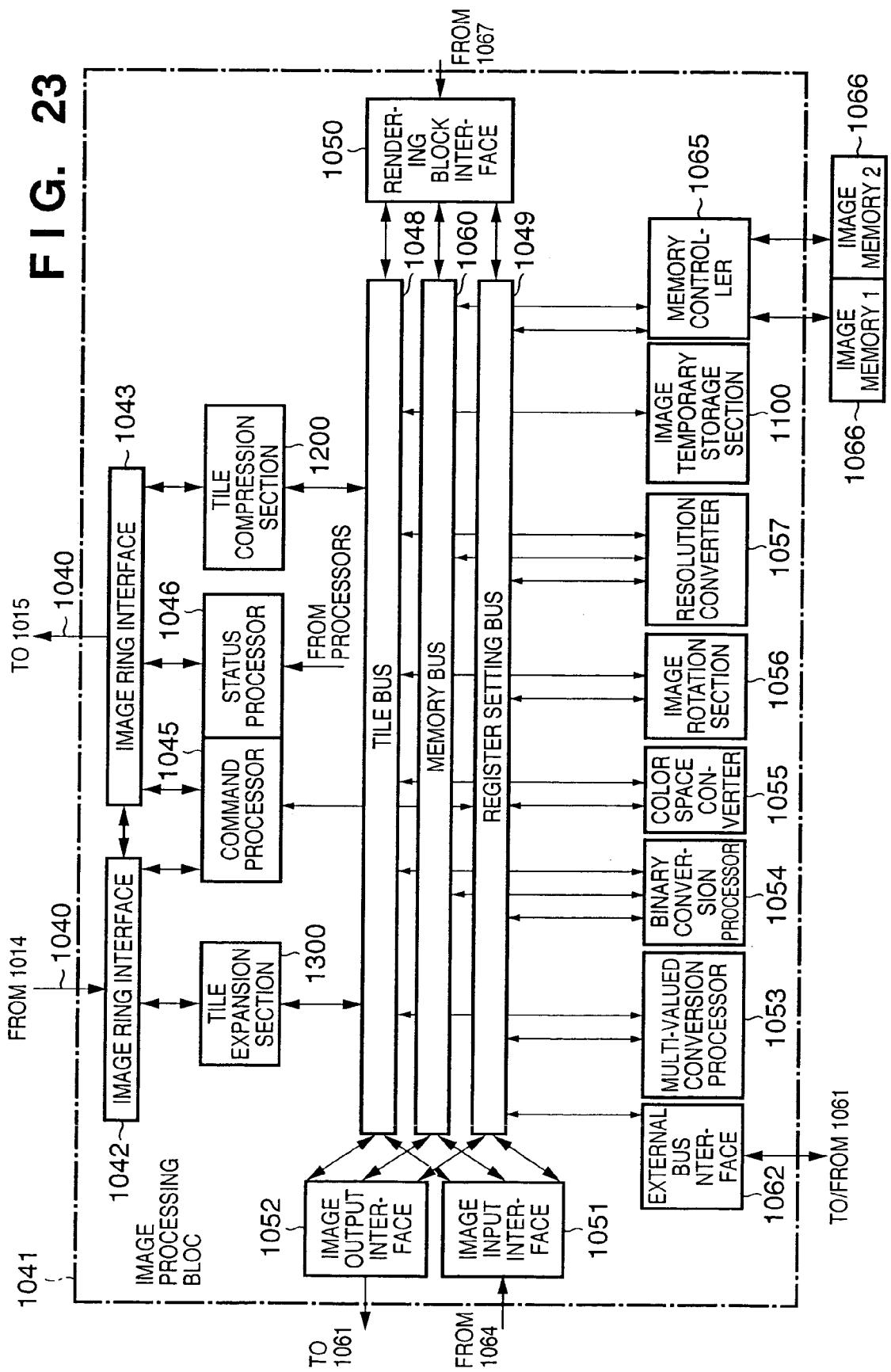
FIG. 23 is a block diagram showing the detailed arrangement of the image processing block 1041 in the controller unit 1001 of an image processing apparatus according to the second embodiment of the present invention.

Respective blocks which form the image processing block 1041 of the second embodiment will be described below using FIG. 23. In this embodiment, only different blocks from the first embodiment will be explained.

The image processing block 1041 of this embodiment is substantially the same as that of the first embodiment, except that an image temporary storage section 1100 is connected to the tile bus 1048 in place of the image property information substitution section 1058, the function of a tile compression section 1200 is different from that of the tile compression section 1047, and the function of a tile expansion section 1300 is different from that of the tile expansion section 1044. The image temporary storage section 1100 temporarily stores received image data in its internal memory, and transmits the received data to other blocks as soon as data storage is complete.

As for the data format used in this embodiment, in the controller unit 1001 in this embodiment, image data, commands from each CPU 1006, interrupt information from respective blocks are transferred in a packetized format. Note that the three different types of packets, i.e., the data, command, and interrupt packets are respectively the same as the data packet with the structure shown in FIG. 16, the command packet with the structure shown in FIG. 17, and the interrupt packet with the structure shown in FIG. 18 described in the first embodiment, and a detailed description thereof will be omitted.

<Tile Compression Section 1200>

Figure 24:
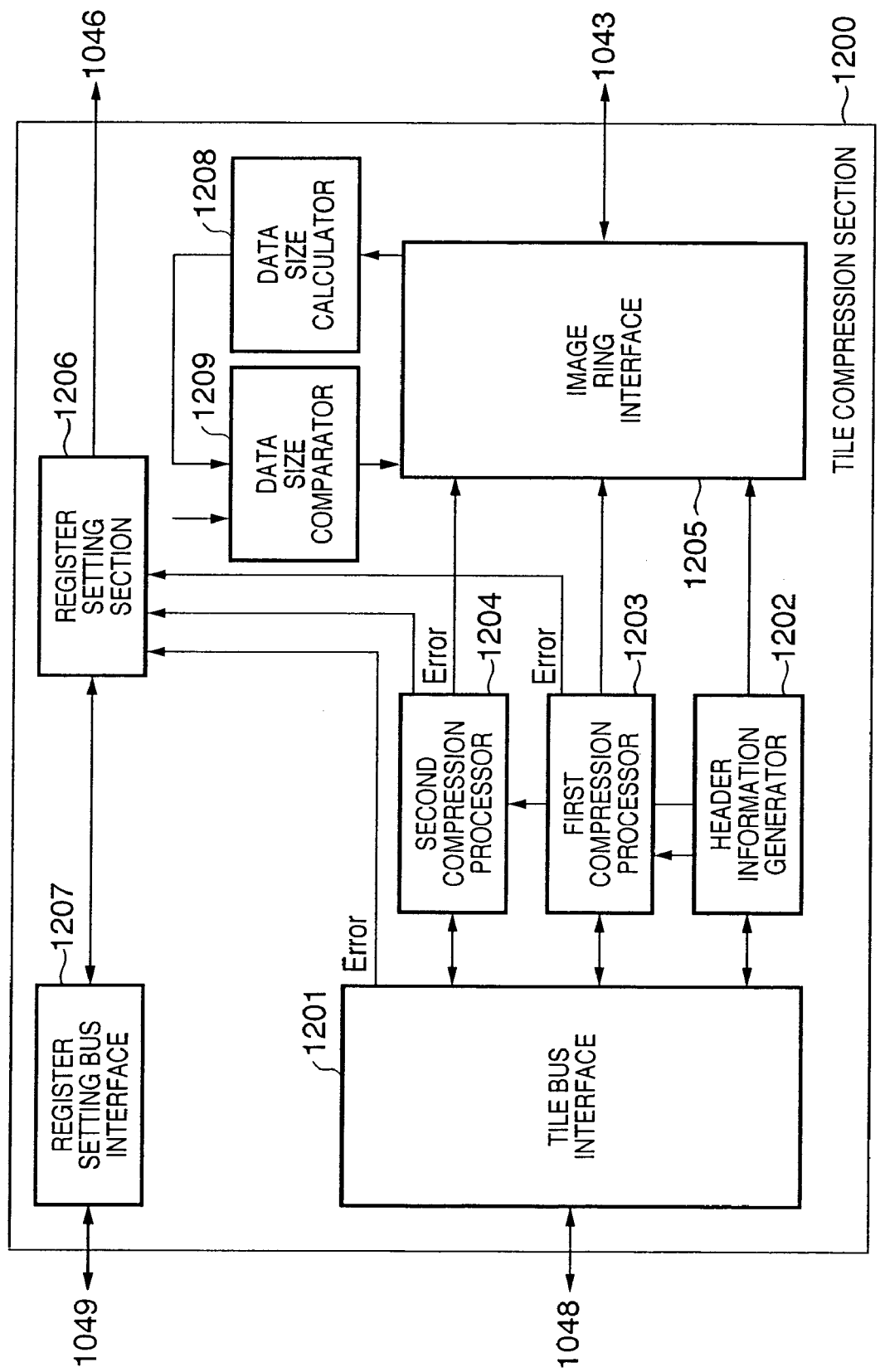
FIG. 24 is a block diagram showing the functional arrangement of a tile compression section 1200.

The tile compression section 1200 of the second embodiment will be described in detail below. FIG. 24 is a block diagram showing the functional arrangement of the tile compression section 1200 of the second embodiment. Referring to FIG. 24, reference numeral 1201 denotes a tile bus interface, which makes handshake with the tile bus 1048 to acquire header information, image data, and image property information input from the tile bus 1048, and outputs the acquired data to respective processing blocks connected to the subsequent stage.

The tile bus interface 1201 analyzes the header information sent from the tile bus 1048. If inconsistency is found in the header information, the tile bus interface 1201 outputs an interrupt signal corresponding to the inconsistency contents to a register setting section 1206 (to be described later), and halts its operation until it receives a reset signal (not shown).

If no inconsistency is found in the header information, the tile bus interface 1201 outputs the header information to a header information generator 1202 connected to the subsequent stage. After that, the tile bus interface 1201 acquires image data and image property information from the tile bus 1048, and outputs the image data or image property information to a first compression processor 1203 (which executes a JPEG compression process in this embodiment) and second compression processor 1204 (which executes a PackBits compression process in this embodiment) in accordance with the contents of the Image Type field 3006 in the header information.

More specifically, when the upper 2 bits of the Image Type field 3006 are 00b indicating 1-bit image data, the tile bus interface 1201 outputs the image data to the second compression processor 1204 without using the first compression processor 1203.

On the other hand, when the upper 2 bits of the Image Type field are other than 00b, the tile bus interface 1201 outputs the image data to the first compression processor 1203, and outputs the image property information to the second compression processor 1204. In this case, when the value of the Z type field 3020 is zero, since the input image property information is invalid, the tile bus interface 1201 does not output the image property information to the second compression processor 1204 to skip its compression process.

Reference numeral 1202 denotes a header information generator, which generates header information while the first and second compression processors 1203 and 1204 execute the compression processes of the image data and image property information. The header information generator 1202 outputs information required for the compression processes from the stored header information to the first and second compression processors 1203 and 1204.

Reference numeral 1203 denotes a first compression processor, which executes the JPEG compression process, as described above. The first compression processor 1203 executes a compression process of image data when image data has a multi-bit configuration. The first compression processor 1203 has a buffer for storing the input image data for one tile, and holds image data of the packet processed at the immediately preceding timing until image data of the next packet is input, thus comparing image data input from the tile bus interface 1201 with that stored in the buffer. The comparison result is output to an image ring output section 1205 (to be described later), and is referred to upon generation of the Repeat Flag 3022.

When any operation abnormality is detected during the compression process in the first compression processor 1203, the first compression processor 1203 outputs an interrupt signal corresponding to the contents of the abnormal operation to the register setting section 1206, and halts its operation until it receives a reset signal (not shown).

The second compression processor 1204 executes a compression process based on a compression method free from any information loss, i.e., PackBits. The second compression processor 1204 compresses, by PackBits, image data when image data of the input packet has a 1-bit configuration, and compresses image property information when the image property information is available (i.e., the value of the Z type field 3020 is not zero).

The second compression processor 1204 also has a buffer for storing input image property information for one packet, and holds 1-bit image data or image property information input at the immediately preceding timing, thus comparing image data or image property information input from the tile bus interface 1201 with data stored in the buffer. The comparison result is output to the image ring output section 1205 (to be described later), and is referred to upon generation of the Repeat Flag 3022.

When any operation abnormality is detected during the compression process in the second compression processor 1204, the second compression processor 1204 outputs an interrupt signal corresponding to the contents of the abnormal operation to the register setting section 1206, and halts its operation until it receives a reset signal (not shown).

Reference numeral 1205 denotes an image ring output section, which acquires processing information, image data, and image property information from the header information generator 1202, and first and second compression processors 1203 and 1204. The image ring output section 205 sets a predetermined value in the header information, then generates a data packet shown in FIG. 16, and outputs that packet to the image ring interface 1043.

Reference numeral 1206 denotes a register setting section used to make setups that pertain to internal processes of the tile compression section 1200. In order to make the tile compression section 1200 execute a predetermined compression process, prescribed values (values determined (programmed) in advance to control the compression processors) must be set in the register setting unit 1206. These values are set by sending a command packet from the system control block 2150 to the command processor 1045 in the image processing block 1041, and then sending it from the command processor 1045 to the tile compression section 1200 via the register setting bus 1049. The values set in the register setting section 1206 are sent to the first and second compression processors 1203 and 1204, which execute predetermined processes with reference to these setting values.

Note that not only values are set in the register setting section 1206 using a command packet, but also the setting values held by the register setting section 1206 can be output to the system control block 2150 using a command packet.

Furthermore, the register setting section 1206 has registers corresponding to interrupt signals input from the tile bus interface 1201, and the first and second compression processors 1203 and 1204. Upon reception of an interrupt signal input from one of these blocks, the register setting section 1206 sets a value of the corresponding register, and outputs an interrupt signal which informs generation of an interrupt and a status signal indicating the block that generated the interrupt to the status processor 1046.

Reference numeral 1207 denotes a register setting bus interface, which converts an address and setting values input from the register setting bus 1049 to the tile compression section 1200 into a format that the register setting section 1206 can receive, and sends them to the register setting section 1206.

Note that the register setting bus interface 1207 not only receives the register setting values from the register setting bus 1049, but also can read out setting values corresponding to an address designated by the register setting bus 1049 and output the readout setting values onto the register setting bus 1049.

Reference numeral 1208 denotes a data size calculator, which is a block for calculating the accumulated value of the data sizes of compressed image data, which are output from the image ring output section 1205 to the image ring interface 1043 for each Page ID 3007 in the packet header. That is, the data size calculator 1208 sequentially adds up the sizes of compressed data for respective tiles that form one page, and obtains a total value.

The data size calculator 1208 accumulates the data sizes of compressed image data output from the image ring output section 1205 unless the value of the Page ID 3007 is changed. When the value of the Page ID 3007 has been changed, the data size accumulated value is reset to zero. In this way, the size of compressed data for each page can be calculated.

Reference numeral 1209 denotes a data size comparator, which is a block for comparing the accumulated value of the data sizes calculated by the data size calculator 1208 with a data threshold value set in the register setting section 1206, and for outputting the comparison result to the image ring output section 1205.

When it is determined based on the comparison result signal from the data size comparator 1209 that the data size accumulated value has exceeded the threshold value, the image ring output section 1205 ceases to add image property information in data packets to be output with the identical Page ID. At this time, the values of the Z type 3020 and Z Data Byte Length 3016 in the packet header are zero.

<Tile Expansion Section 1300>

Figure 25:
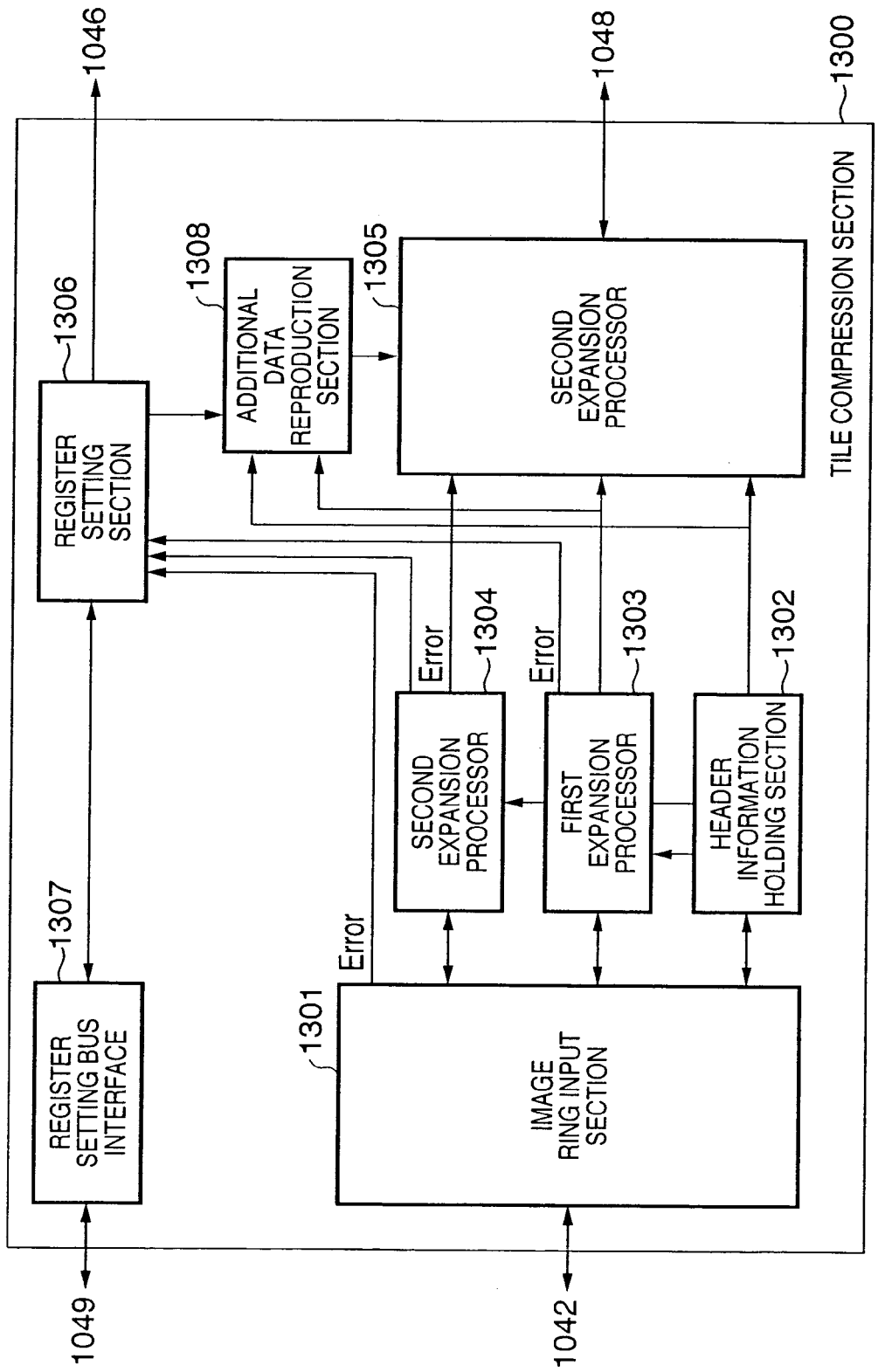
FIG. 25 is a block diagram showing the functional arrangement of a tile expansion section 1300.

The tile expansion section 1300 will be described below. FIG. 25 is a block diagram showing the functional arrangement of the tile expansion section 1300 in the second embodiment. Reference numeral 1301 denotes an image ring output section which receives data of a packet with the structure shown in FIG. 16, acquires header information, image data, and image property information contained in this packet, and outputs respective data to subsequent blocks.

The image ring input section 1301 analyzes the header information in the data packet sent from the image ring interface 1042. If inconsistency is found in the header information, the image ring input section 1301 outputs an interrupt signal corresponding to the inconsistency contents to a register setting section 1306 (to be described later), and halts its operation until it receives a reset signal (not shown).

If no inconsistency is found in the header information, the image ring input section 1301 outputs this header information to a subsequent header information holding section 1302. After that, the image ring output section 1301 outputs the image data or image property information to a first expansion processor 1303 (which executes a JPEG expansion process in this embodiment) and second expansion processor 1304 (which executes a PackBits expansion process in this embodiment) in accordance with the contents of the Image Type field 3006 in the header information.

More specifically, when the upper 2 bits of the Image Type field in the header information are 00b indicating 1-bit image data, the image ring output section 1301 outputs the image data to the second expansion processor 1304 without using the first expansion processor 1303.

On the other hand, when the upper 2 bits of the Image Type field are other than 00b, the image ring output section 1301 outputs the image data to the first expansion processor 1303, and outputs the image property information to the second expansion processor 1304.

Reference numeral 1302 denotes a header information holding section, which holds the header information input via the image ring input section 1301 while the first and second expansion processors 1303 and 1304 execute the expansion processes of the image data and image property information. The header information holding section 1302 outputs information required for the expansion processes from the stored header information to the first and second expansion processors 1303 and 1304.

Reference numeral 1303 denotes a first expansion processor, which executes the JPEG expansion process of input compressed data in this embodiment. As described above, the first expansion processor 1303 receives compressed data of an image whose pixel is expressed by a plurality of bits. The first expansion processor 1303 has a buffer for storing image data to be expanded for one tile, and holds tile image data processed at the immediately preceding timing until image data of the next packet is input. Then, the first expansion processor 1303 refers to the Repeat Flag 3022 in the header of the input packet, and outputs the tile image data stored in the buffer to a tile bus interface 1305 if the flag is "1".

When the first expansion processor 1303 detects any operation abnormality during its expansion process, it outputs an interrupt signal corresponding to the contents of the abnormal operation to the register setting section 1306, and halts its operation until it receives a reset signal (not shown).

Reference numeral 1304 denotes a second expansion processor, which executes an expansion process of input compressed data based on an expansion method free from any information loss, i.e., PackBits in this embodiment. As described above, the second expansion processor 1304 receives compressed data of an image whose pixel is expressed by 1 bit. If packet data contains image property information (the value of the Z type field 3020 is not zero), the second expansion processor 1304 also expands this image property information by PackBits.

As in the first expansion processor 1303, the second expansion processor 1304 also has a buffer for storing expanded image data for one tile, and holds the tile image data processed at the immediately preceding timing. Then, the second expansion processor 1304 refers to the Repeat Flag 3022 in the header of the input packet, and outputs the tile image data stored in the buffer to the tile bus interface 1305 if the flag is "1".

When the second expansion processor 1304 detects any operation abnormality during its expansion process, it outputs an interrupt signal corresponding to the contents of the abnormal operation to the register setting section 1306, and halts its operation until it receives a reset signal (not shown).

Reference numeral 1305 denotes a tile bus interface, which acquires required information in the header from the header information holding section 1302, and image data and image property information from the first or second expansion processor 1303 or 1304 as data for one tile, and outputs the data for one tile onto the tile bus 1048 in accordance with the protocol of the tile bus.

Reference numeral 1306 denotes a register setting section used to make setups that pertain to internal processes of the tile expansion section 1300. In order to make the tile expansion section 1300 execute a predetermined expansion process, prescribed values (values determined (programmed) in advance to control the expansion processors) must be set in the register setting unit 1306. These values are set by sending a command packet from the system control block 2150 to the command processor 1045 in the image processing block 1041, and then sending it from the command processor 1045 to the tile expansion section 1300 via the register setting bus 1049.

The values set in the register setting section 1306 are sent to the first and second expansion processors 1303 and 1304, which execute predetermined processes with reference to these setting values.

Note that not only values are set in the register setting section 1306 using a command packet, but also the setting values held by the register setting section 1306 can be output to the system control block 2150 using a command packet.

Furthermore, the register setting section 1306 has registers corresponding to interrupt signals input from the image ring input section 1301, and the first and second expansion processors 1303 and 1304. Upon reception of an interrupt signal input from one of these blocks, the register setting section 1306 sets a value of the corresponding register, and outputs an interrupt signal which informs generation of an interrupt and a status signal indicating the block that generated the interrupt to the status processor 1046.

Reference numeral 1307 denotes a register setting bus interface, which converts an address and setting values input from the register setting bus 1049 to the tile expansion section 1300 into a format that the register setting section 1306 can receive, and sends them to the register setting section 1306. Note that the register setting bus interface 1207 cannot only receive the register setting values from the register setting bus 1049, but also read out setting values corresponding to an address designated by the register setting bus and output the readout setting values onto the register setting bus.

Reference numeral 1308 denotes an image additional data reproduction section, which refers to the Z type 3020 in the header information held in the header information holding section 1302, and generates the following three pieces of information as information associated with expanded tile image data to be output from the first and second expansion processors 1303 and 1304 using the tile image data, when the value of the Z type 3020 is zero, i.e., when no image property information is contained in the received packet (including a case wherein the image property information is invalid):

information indicating whether each pixel has a chromatic or achromatic color information indicating whether or not each pixel is an isolated point information indicating whether or not each pixel is a text part These three pieces of information will be described below.

<Determination of Chromatic/Achromatic Color>

Using data of an image whose pixel is expressed by a plurality of bits, i.e., a color image which is input from the first expansion processor 1303, whether or not each pixel of this image has a chromatic or achromatic color is determined. As the determination method, the maximum and minimum values of R, G, and B (or C, M, and Y) components of a pixel are calculated and compared to determine whether the pixel value of that pixel indicates a chromatic or achromatic color. For example, in case of YUV, a chromatic or achromatic color can be determined by examining if UV is near 80 h.

<Determination of Isolated Point>

In an image input from the first or second expansion processor 1303 or 1304, whether or not the pixel of interest is an isolated point is determined. In this case, whether or not this pixel of interest is an isolated point is determined using a window of a 5×5 size. In this way, flag information indicating whether or not each pixel which form the image is an isolated point is obtained.

Since this method of determining an isolated point is a state-of-the-art technique, a detailed explanation thereof will be omitted. However, in this embodiment, the method of determining an isolated point is not particularly limited, and other methods may be used.

<Determination of Text Flag>

In an image input from the first or second expansion processor 1303 or 1304, whether or not the pixel of interest is a pixel in a text region is determined. In this case, the slope of a density is calculated based on the derivative of 3×3 pixels to make edge determination. If the pixel of interest has an achromatic color and corresponds to an edge, it is determined that the pixel of interest is a text pixel. Since this technique is also known to those who are skilled in the art, a detailed description thereof will be omitted. However, this embodiment is not limited to such specific method.

Figure 26:
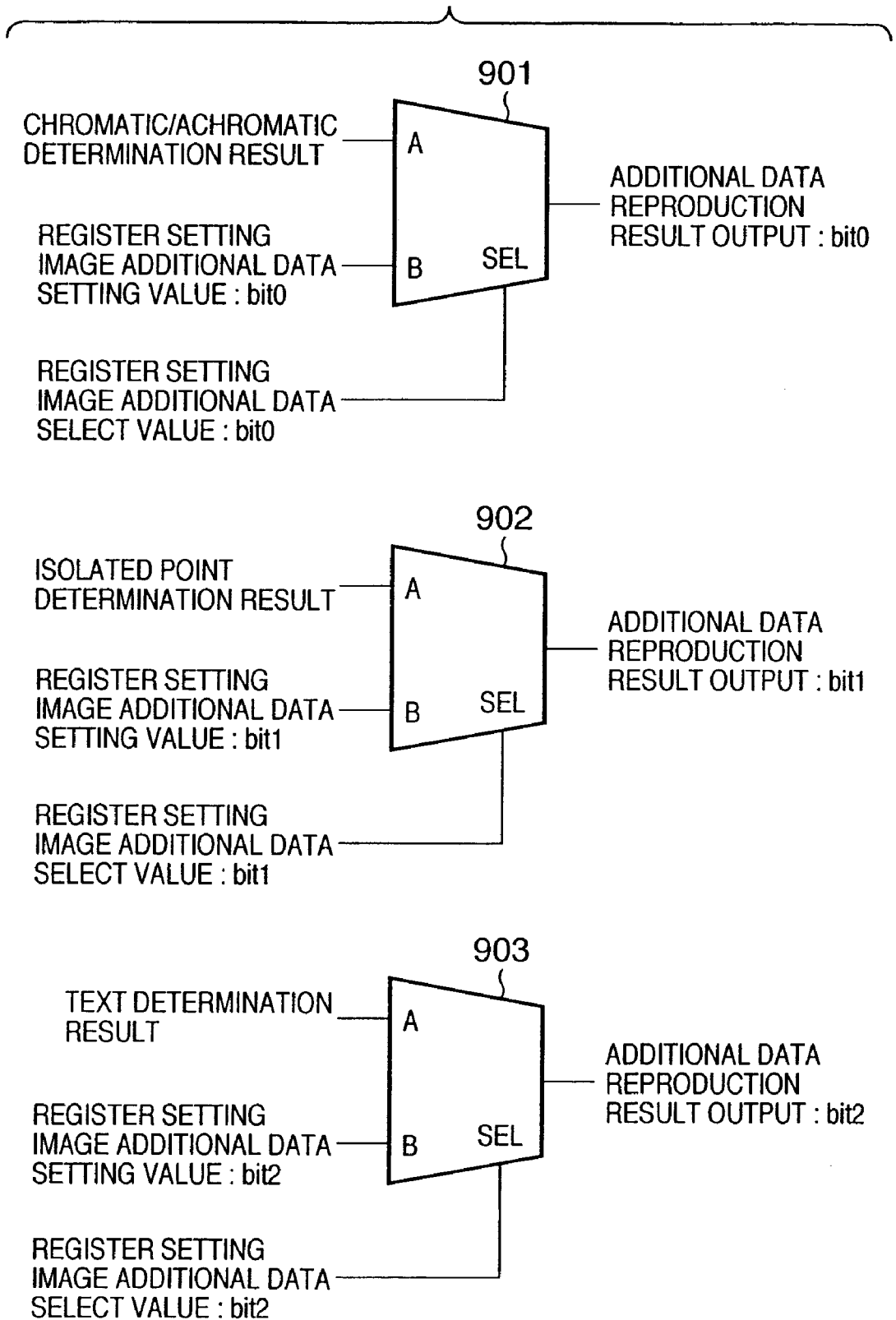
FIG. 26 is a schematic diagram showing the arrangement of a circuit for selecting image property information to be output depending on a value set in a register setting section 1306.

The image additional data reproduction section 1308 comprises a circuit for selecting image property information to be output depending on the value set in the register setting section 1306. FIG. 26 is a schematic block diagram showing the arrangement of this circuit.

Reference numerals 901, 902, and 903 denote selectors. Respective bits of a 3-bit image additional data setting value (a value determined (programmed or set by the user at the control block) in advance, which is switched depending on the operation mode of a device) serve as select signals for these selectors. In case of FIG. 26, the first bit (bit0) of these three bits is used as a select signal for the selector 901; the next bit (bit1) is used as a select signal for the selector 902, and the last bit (bit2) is used as a select signal for the selector 903.

Each of the selectors 901, 902, and 903 selects additional data generated by the image additional data reproduction section 1308 if the corresponding select signal is "0", and outputs image additional data setting value set in the register setting section 1306 if the select signal is "1". Image property information is 3-bit information per pixel of image data, and respective bits have meanings.

FIG. 27 shows the configuration of the image property information. If bit0 is 0, it indicates that corresponding image data has a chromatic color. If bit0 is 1, it indicates that corresponding image data has an achromatic color. If bit1 is 0, it indicates that corresponding image data is not isolated point data; if bit1 is 1, it indicates that corresponding image data is isolated point data. If bit2 is 0, it indicates that corresponding image data is other than text data; if bit2 is 1, it indicates that corresponding image data is text data.

This image property information is transferred to the printer 1003 together with image data, and the printer 1003 uses this image property information as image processing parameters unique to the printer. Conventionally, in case of image data without image property information, an actual image output process is not disturbed, but a print mode for high-definition, high-quality image setups cannot be selected. However, with this embodiment, even when image data without image property information is input, the print mode for high-definition, high-quality image setups can be used, and an image that satisfies the user can be output.

Figure 28:
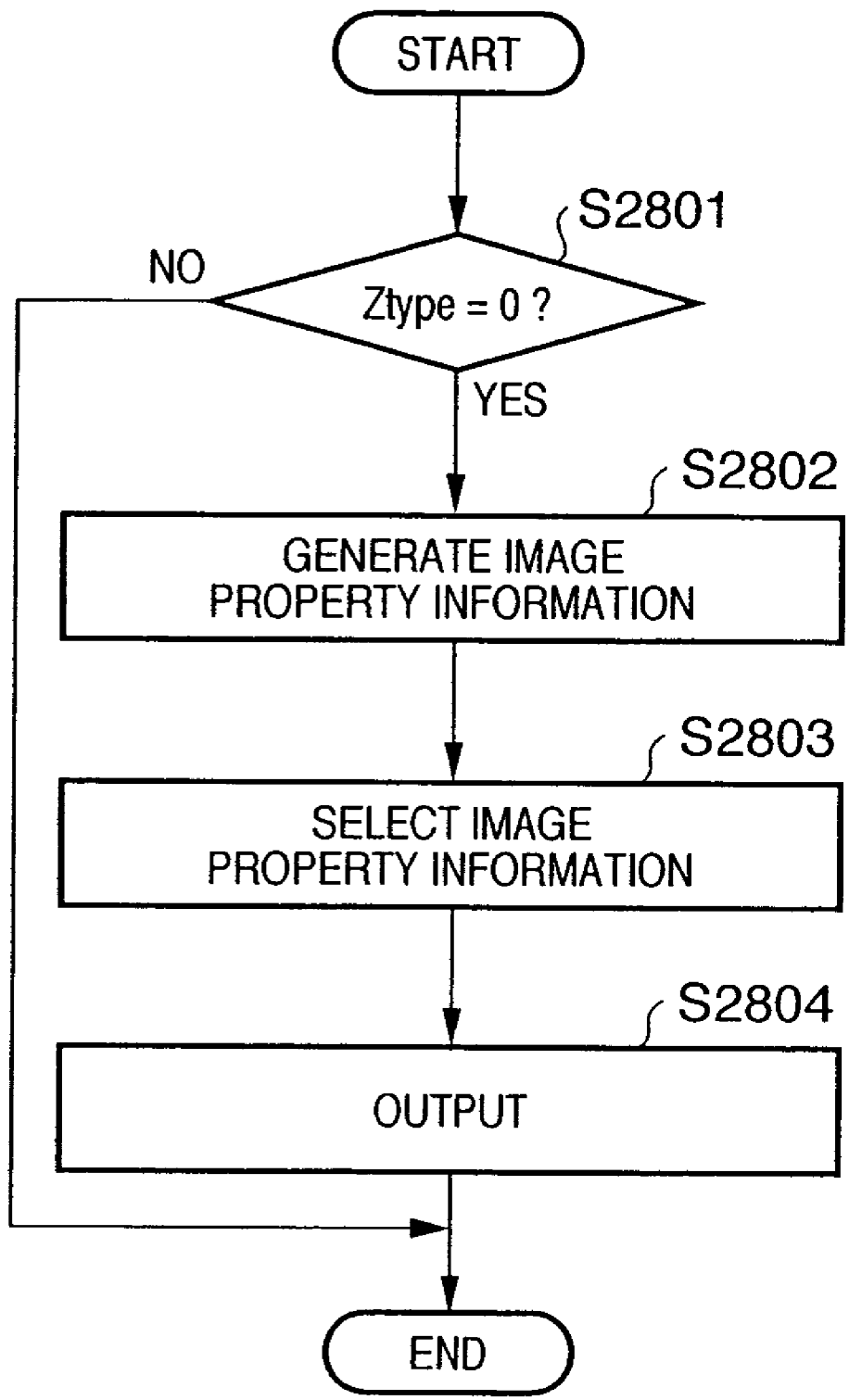
FIG. 28 is a flow chart showing the process to be executed by an image additional data reproduction section 1308.

FIG. 28 is a flow chart showing the process to be executed by the image additional data reproduction section 1308. Initially, the value of the Z type 3020 in the header information of a packet is referred to, and if it is zero (step S2801), the flow advances to step S3802. Since it is determined that no image property information is included in the packet, image property information is generated based on expanded image data output from the expansion processor by the aforementioned method (step S2802). Then, as shown in FIG. 27, the image property information is selected (step S2803), and is output (step S2804).

As described above, according to this embodiment, an identical image process is applied within one page in a conventional print process using image data alone, while since image property information is used in this embodiment, image processes according to the property of each pixel can be applied for each pixel within one page.

As described above, according to the present invention, even when no image property information is added to compressed image data, a high-quality process utilizing image property information can be realized using this compressed image data.

Third Embodiment

A preferred embodiment of the present invention will be described in detail hereinafter with reference to the accompanying drawings.

<Overview of Network System>

A schematic arrangement of a network system which includes an image processing apparatus according to the third embodiment is the same as that of the network system shown in FIG. 12 explained in the first embodiment.

<Overview of Image Processing Apparatus>

The basic arrangement of the image processing apparatus according to the third embodiment is substantially the same as that of the image processing apparatus described using FIG. 13 in the first embodiment. That is, the controller unit 1001 is connected to the scanner 1002 as an image input device and the printer 1003 as an image output device, and also to the LAN 1004 or public line (WAN) 1005, so as to input/output image information and device information, and to execute a control process required to render PDL data to an image. Since the system control block 2150 is the same as that explained using FIG. 14 in the first embodiment, a description thereof will be omitted.

<Overview of Image Processing Block>

The image processing block in the third embodiment is substantially the same as that of the first embodiment, except for the function of the second compression processor in the tile compression section.

In this embodiment, the tile expansion section executes a JPEG compression process when image data to be compressed is multi-valued image data, or a PackBits compression process when image data to be compressed is binary image data. However, the present invention is not limited to such specific processes as in the expansion process.

<Tile Expansion Section>

Figure 29:
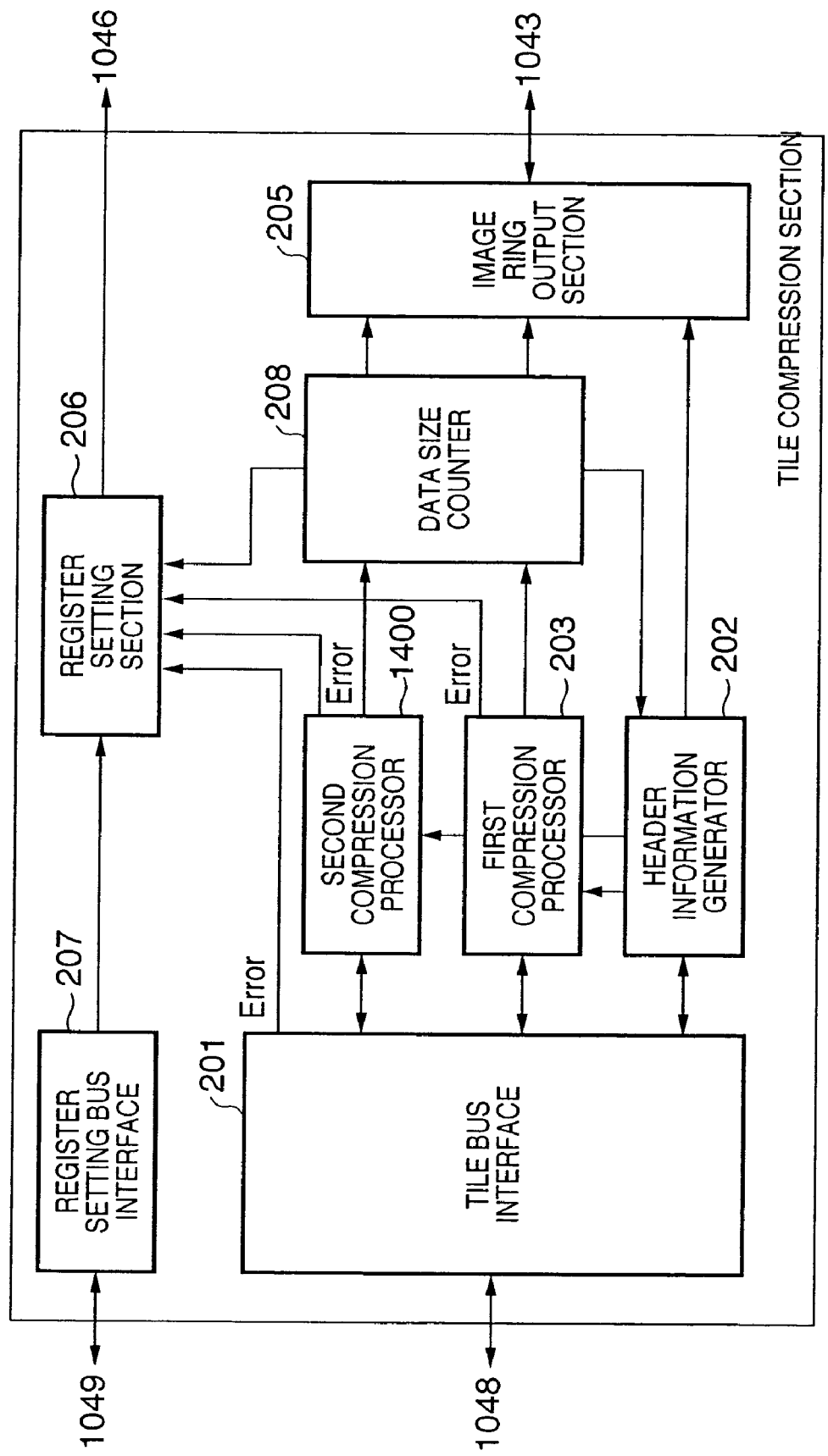
FIG. 29 is a block diagram showing the functional arrangement of a tile compression section in the third embodiment.

The tile expansion section in the third embodiment will be described in detail below. The basic functional arrangement of the tile compression section in this embodiment is substantially the same as that of the tile compression section 1047 explained in the first embodiment using FIG. 2, except for the second compression processor. That is, FIG. 29 is a block diagram showing the arrangement of a tile compression section in the image processing apparatus according to the third embodiment. As shown in FIG. 29, a tile bus interface 201 makes handshake with the tile bus 1048 to acquire header information, image data, and image property information input from the tile bus 1048, and outputs the acquired data to respective processing blocks connected to the subsequent stage.

The tile bus interface 201 analyzes the header information sent from the tile bus 1048. If inconsistency is found in the header information, the tile bus interface 201 outputs an interrupt signal corresponding to the inconsistency contents to a register setting section 206 (to be described later), and halts its operation until it receives a reset signal (not shown).

If no inconsistency is found in the header information, the tile bus interface 201 outputs the header information to a header information generator 202 connected to the subsequent stage. After that, the tile bus interface 201 acquires image data and image property information from the tile bus 1048, and outputs the image data or image property information to a first compression processor 203 (which executes a JPEG compression process in this embodiment) and second compression processor 1400 (which executes a PackBits compression process in this embodiment) in accordance with the contents of the Image Type field 3006 in the header information.

More specifically, when the upper 2 bits of the Image Type field are 00b indicating 1-bit image data, the tile bus interface 201 outputs the image data to the second compression processor 1400 without using the first compression processor 203.

On the other hand, when the upper 2 bits of the Image Type field are other than 00b, the tile bus interface 201 outputs the image data to the first compression processor 203, and outputs the image property information to the second compression processor 1400. In this case, when the value of the Z type field 3020 is zero, since the input image property information is invalid, the tile bus interface 201 does not output the image property information to the second compression processor 1400 to skip its compression process.

The header information generator 202 generates header information while the first and second compression processors 203 and 1400 execute the compression processes of the image data and image property information. The header information generator 202 outputs information required for the compression processes from the stored header information to the first and second compression processors.

The first compression processor 203 executes a JPEG compression process, as described above. The first compression processor 203 executes a compression process of image data when image data has a multi-bit configuration. The first compression processor 203 has a buffer for storing the input image data for one tile, and holds image data of the packet processed at the immediately preceding timing until image data of the next packet is input, thus comparing image data input from the tile bus interface 201 with that stored in the buffer. The comparison result is output to an image ring output section 205 (to be described later), and is referred to upon generation of the Repeat Flag 3022.

When any operation abnormality is detected during the compression process in the first compression processor 203, the first compression processor 203 outputs an interrupt signal corresponding to the contents of the abnormal operation to the register setting section 206, and halts its operation until it receives a reset signal (not shown).

The second compression processor 1400 executes a compression process based on a compression method free from any information loss, i.e., PackBits. The second compression processor 1400 compresses, by PackBits, image data when image data of the input packet has a 1-bit configuration, and compresses image property information when the image property information is available (i.e., the value of the Z type field 3020 is not zero).

The second compression processor 1400 also has a buffer for storing input image property information for one packet, and holds 1-bit image data or image property information input at the immediately preceding timing, thus comparing image data or image property information input from the tile bus interface 201 with data stored in the buffer. The comparison result is output to the image ring output section 205 (to be described later), and is referred to upon generation of the repeat flag 3022.

When any operation abnormality is detected during the compression process in the second compression processor 1400, the second compression processor 1400 outputs an interrupt signal corresponding to the contents of the abnormal operation to the register setting section 206, and halts its operation until it receives a reset signal (not shown).

The image ring output section 205 acquires processing information, image data, and image property information from the header information generator 202, and first and second compression processors 203 and 1400. The image ring output section 205 sets a predetermined value in the header information, then generates a data packet shown in FIG. 16, and outputs that packet to the image ring interface 1043.

The register setting section 206 makes setups that pertain to internal processes of the tile compression section 1047. In order to make the tile compression section 1047 execute a predetermined compression process, parameters such as a compression ratio, JPEG Q-Table, data limit value used in a data count process (to be described later), and the like must be set in the register setting section 206. These parameters are set by sending a command packet from the system control block 2150 to the command processor 1045 in the image processing block 1041, and then sending it from the command processor 1045 to the tile compression section 1047 via the register setting bus 1049. The values set in the register setting section 206 are sent to the first and second compression processors 203 and 1400, which execute predetermined processes with reference to these setting values.

Note that not only values are set in the register setting section 206 using a command packet, but also the setting values held by the register setting section 206 can be output to the system control block 2150 using a command packet.

Furthermore, the register setting section 206 has registers corresponding to interrupt signals input from the tile bus interface 201, and the first and second compression processors 203 and 1400. Upon reception of an interrupt signal input from one of these blocks, the register setting section 206 sets a value of the corresponding register, and outputs an interrupt signal which informs generation of an interrupt and a status signal indicating the block that generated the interrupt to the status processor 1046.

A register setting bus interface 207 converts an address and setting values input from the register setting bus 1049 to the tile compression section 1047 into a format that the register setting section 206 can receive, and sends them to the register setting section 206.

Note that the register setting bus interface 207 not only receives the register setting values from the register setting bus 1049, but also can read out setting values corresponding to an address designated by the register setting bus 1049 and output the readout setting values onto the register setting bus 1049.

A data size counter 208 counts the data size of image data and image property information sent from the first and second compression processors 203 and 1400 to the image ring output section 205, and outputs an interrupt signal to the register setting section 206 and a flag signal to the header information generator 202 when the data size has exceeded a predetermined value.

<Second Compression Processor 1400>

Figure 30:
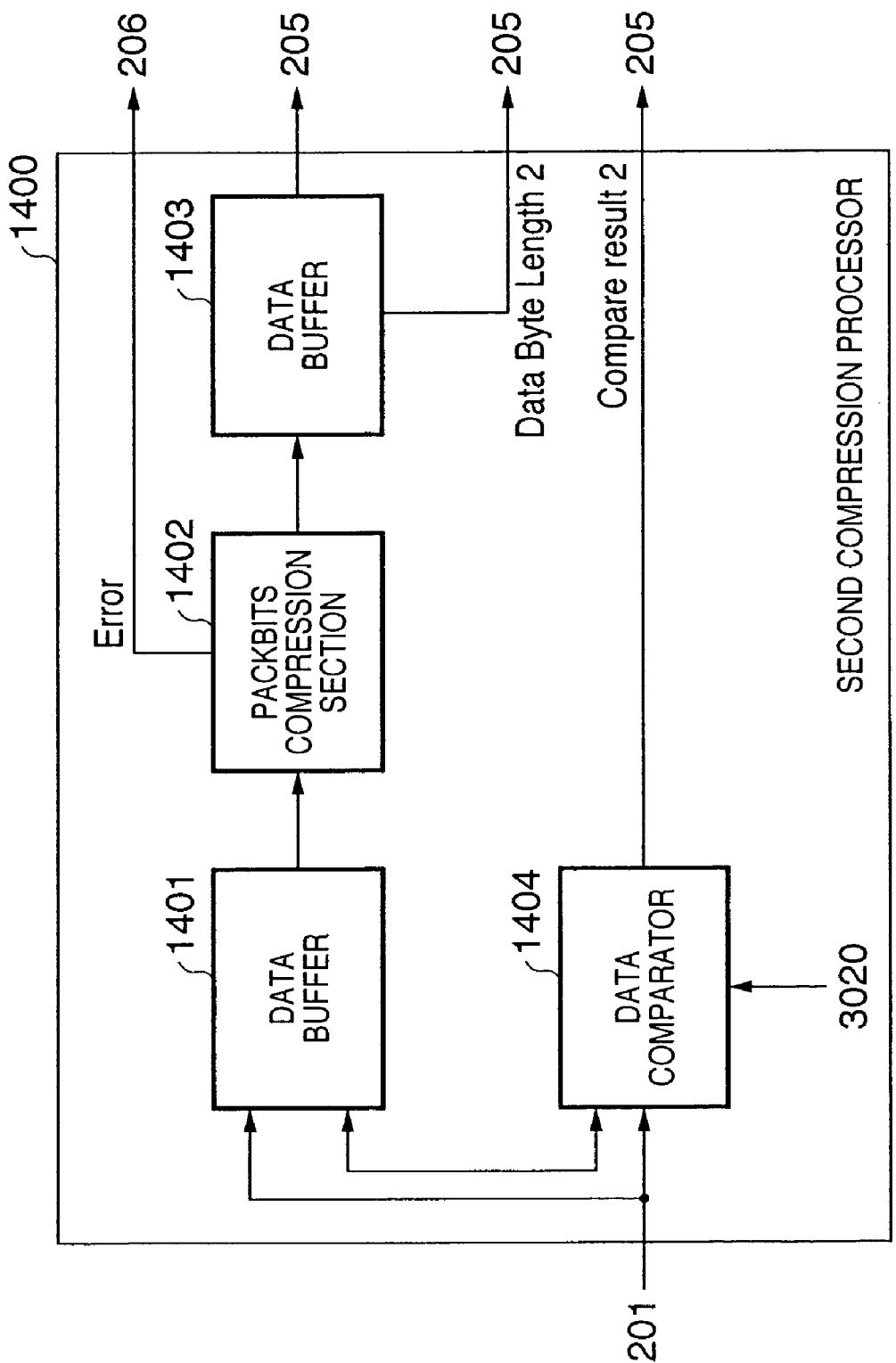
FIG. 30 is a block diagram showing the functional arrangement of a second compression processor 1400 in the third embodiment.

FIG. 30 is a block diagram showing the functional arrangement of the second compression processor 1400 in the third embodiment. Referring to FIG. 30, reference numeral 1401 denotes a data buffer which is used to store image property information sent from the tile bus interface 201. When the stored data reaches a predetermined size, the data buffer 1401 outputs data to a PackBits compression section 1402 connected to the subsequent stage in accordance with a predetermined order.

Reference numeral 1402 denotes a PackBits compression section, which compresses image property information output from the data buffer 1401 by PackBits.

Reference numeral 1403 denotes a data buffer which is used to store compressed data which is compressed by the PackBits compression section 1402. When compressed data for one tile is acquired from the PackBits compression section 1402, the data buffer 1403 outputs the size of the stored data as Data Byte Length2 to the image ring output section 205.

The data buffer 1403 outputs the stored compressed data to the image ring output section 205 in accordance with a request from the image ring output section 205.

Reference numeral 1404 denotes a data comparator which compares image data input from the tile bus interface 201 with data stored in the data buffer 1401. That is, data sent from the tile bus interface 201 is stored in the data buffer 1401, and is simultaneously compared by the data comparator 1404 with image data which was stored in the data buffer 1401.

Since the data buffer 1401 stores image property information sent to the second compression processor 1400 before a tile input from the tile bus interface 201, the data comparator

1404 compares image property information sent from the tile bus interface 201 with that for an immediately preceding tile in the second compression processor 1400 by the aforementioned operation.

Upon completion of comparison of image property information for one tile by the data comparator 1404, the data comparator 1404 outputs a comparison result (Compare result 2) to the image ring output section 205.

[Control of Image Property Information by Data Size Count]

Figure 31:
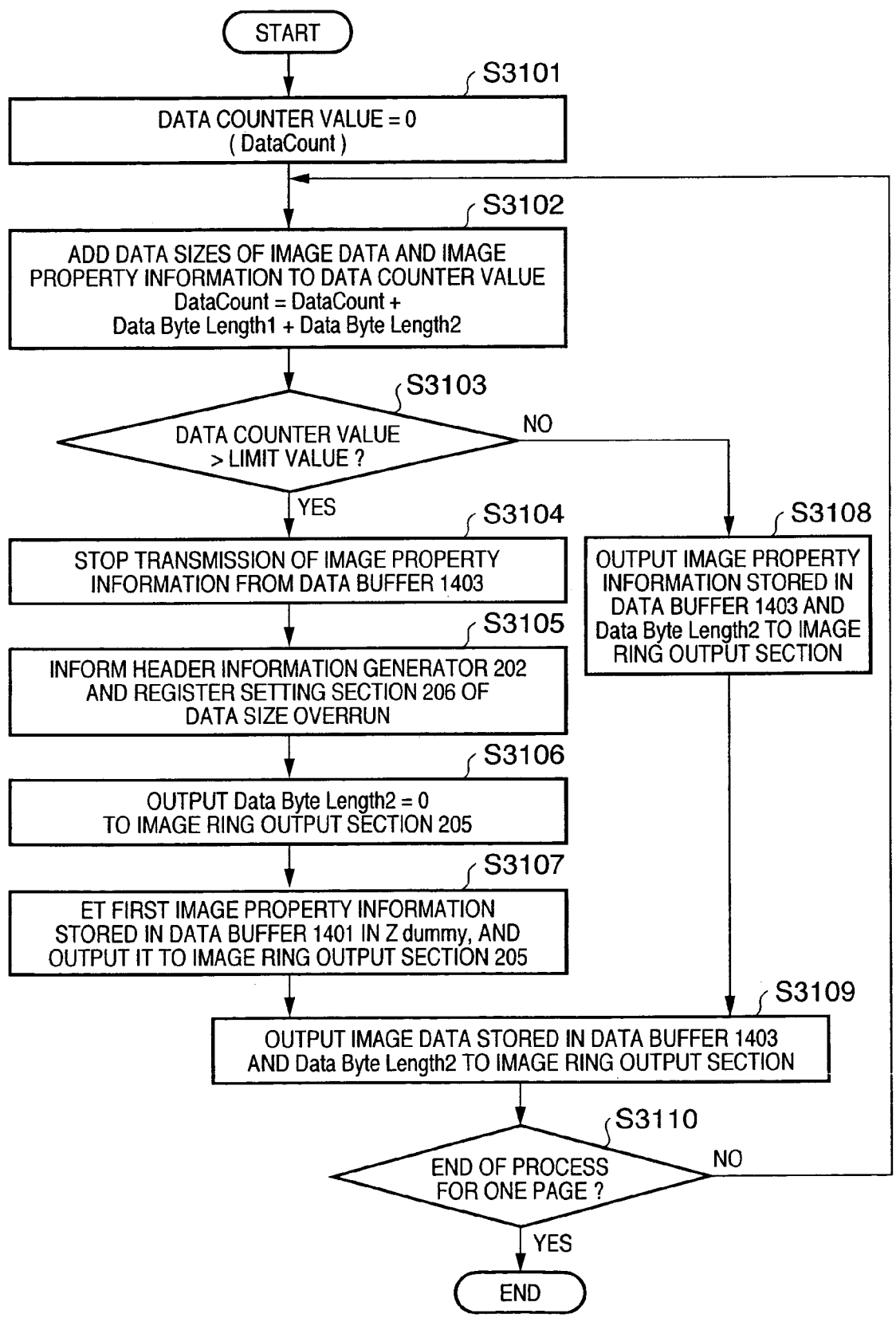
FIG. 31 is a flow chart showing the data count process to be executed by a tile compression section of the third embodiment.

FIG. 31 is a flow chart showing the data count process to be executed by the tile compression section according to third embodiment.

When the tile compression section starts a compression process, a data counter value (Data Count) is set to zero (step S3101). Upon completion of the compression processes in the first and second compression processors 203 and 1400, these processors output the compressed data sizes (Data Byte Length1, Data Byte Length2) to the data size counter 208, which adds these sizes to the data counter value (Data Count) (step 53102). The data counter value (Data Count) is compared with a pre-set limit value (step S3103).

If it is determined that the data counter value is larger than the limit value, the flow advances to step S3104 to stop transmission of image property information from the data buffer 1403 (step S3104).

A Compress Fail signal is output to the header information generator 202 and register setting section 206 to inform them that the data size has overrun (step S3105). Upon reception of the Compress Fail signal, the register setting section 206 outputs an interrupt signal to the status processor 1046. Furthermore, the data size counter 208 sets Data Byte Length2 to zero, and outputs it to the image ring output section 205 (step S3106).

The header information generator 202 refers to an image property information value corresponding to the first pixel of those stored in the data buffer 1401 in the second compression processor 1400, and sets that value in the Z dummy field 3033 (step S3107).

On the other hand, if it is determined in step S3103 that the data counter value does not exceed the limit value, the image property information saved in the data buffer 1403 and Data Byte Length2 are directly output to the image ring output section 205 (step S3108).

The data size counter 208 directly transmits image data saved in the data buffer 1403 and Data Byte Length1 to the image ring output section 205 (step S3109).

It is finally checked if the process for one page is complete (step S3110). If it is determined that the process for one page is not complete yet, the flow returns to step S3102 to repeat the aforementioned process. On the other hand, if it is determined that the process for one page is complete, the data count process ends.

As described above, the image data size upon execution of the compression process is controlled not to exceed a predetermined size to suppress recurrence of an image data read operation, and the image process which can minimize image deterioration can be executed by compensating for omitted image property information by writing it in the header information.

As described above, according to this embodiment, since the transmission data size of image property information is controlled so that the image data size to be transmitted does not exceed a predetermined value, an image input operation need not be redone. In this case, by compensating for substitute information of image property information, a process which can minimize image deterioration can be executed.

In this embodiment, the printer image processing block which is compatible to a tandem-engine printer has been explained. However, the present invention is not limited to such specific arrangement. For example, the image processing block may have an arrangement for a single engine, or one image processing block may comprise image processing blocks for four colors.

As described above, according to the present invention, since the transmission data size of image property information is controlled so that the image data size to be transmitted does not exceed a predetermined value, an image input operation need not be redone. In this case, by compensating for substitute information of image property information, a process which can minimize image deterioration can be executed.

OTHER EMBODIMENTS

Note that the present invention may be applied to either a system constituted by a plurality of devices (e.g., a host computer, interface device, reader, printer, and the like), or an apparatus consisting of a single equipment (e.g., a copying machine, facsimile apparatus, or the like).

The objects of the present invention are also achieved by supplying a recording medium (or storage medium), which records a program code of a software program that can implement the functions of the above-mentioned embodiments to the system or apparatus, and reading out and executing the program code stored in the recording medium by a computer (or a CPU or MPU) of the system or apparatus. In this case, the program code itself read out from the recording medium implements the functions of the above-mentioned embodiments, and the recording medium which stores the program code constitutes the present invention. The functions of the above-mentioned embodiments may be implemented not only by executing the readout program code by the computer but also by some or all of actual processing operations executed by an operating system (OS) running on the computer on the basis of an instruction of the program code.

Furthermore, the functions of the above-mentioned embodiments may be implemented by some or all of actual processing operations executed by a CPU or the like arranged in a function extension card or a function extension unit, which is inserted in or connected to the computer, after the program code read out from the recording medium is written in a memory of the extension card or unit.

When the present invention is applied to the recording medium, that recording medium stores the program codes corresponding to the aforementioned flow charts.

As described above, according to the present invention, appropriate image property information can be provided in correspondence with the operation mode, and a more preferable image process can be realized by arbitrarily switching the priority of image property information to be added.

The present invention is not limited to the above embodiments and various changes and modifications can be made within the spirit and scope of the present invention. Therefore, to apprise the public of the scope of the present invention, the following claims are made.

What is claimed is:

1. An image processing method, comprising:
a division step of inputting an image which has image property information for each pixel, and dividing the input image into a plurality of blocks;
a compression step of compressing each of the divided blocks to generate compression data for each block;

a storage control step of storing sequentially, into a memory, the compression data generated in said compression step;

a first control step of controlling said storage control step so as to generate a first packet including compression data of a block of interest and record the generated first packet into the memory, if total data size of all pieces of compression data stored in the memory does not exceed a predetermined data size upon generating compression data of the block of interest in said compression step;

a second control step of controlling said storage control step so as to generate a second packet and record the generated second packet into the memory if the total data size exceeds the predetermined data size upon generating compression data of the block of interest in said compression step, wherein the second packet includes representative image property information representing the block of interest and includes compression data of the block of interest excluding the image property information;

an expansion step of expanding sequentially each packet stored in the memory;

a first output step of outputting data of each pixel and image property information of each pixel in the block of interest represented by an expanded packet of interest, if there is the image property information for each pixel in the block of interest represented by the expanded packet of interest; and a second output step of outputting the representative image property information included in an expanded packet of interest as the image property information for each pixel in the block of interest represented by the expanded packet of interest, and outputting data of each pixel, in the block of interest represented by the expanded packet of interest, if there is not the image property information for each pixel in the block of interest represented by the expanded packet of interest.

2. The method according to claim 1, wherein the representative image property information is the information property information of the first pixel of a block.

3. The method according to claim 1, further comprising:
a first setting step of setting alternative image property information according to an instruction input from a user;
a second setting step of setting a mode indicating whether or not to give priority to the alternative image property information set in said first setting step; and
a step of controlling said first and second outputting steps to output data of each pixel of each packet and output the alternative image property information so as that data of each pixel included in all packets have the alternative image property information, if one or more packet including the representative image property information is stored in the memory and if the mode is set in the second setting step to give priority to the alternative image property information.

4. The method according to claim 1, further comprising a print step of printing data of each pixel included the expanded packet.

5. The method according to claim 1, wherein the compression step includes a step of compressing each of the divided blocks by JPEG, and compressing the image property information by PackBits.

6. The method according to claim 1, further comprising a flag output step of outputting a flag indicating that the total data size exceeds the predetermined data size.

7. The method according to claim 1, further comprising:
a designation step of designating second image property information used to set a page before coupling upon coupling image data of a plurality of pages into one page, and printing coupled image data;
a substitution step of setting the second image property information as image property information of the expanded image data upon printing the image data; and
a print step of printing the expanded image data.

8. The method according to claim 7, wherein the second image property information contains:
data type identification information used to identify a data type including a raster image and font data;
image type identification information used to identify one of text data and photo data; and
color identification information used to identify one of grayscale data and color data.

9. The method according to claim 7, wherein the second image property information contains:
page information used to identify a page before coupling upon printing image data of a plurality of pages on a single paper sheet;
image type identification information used to identify whether image data is continuous tone data or image data formed by area gradation; and
information used to identify an operation mode of print means.

10. An image processing apparatus, comprising:
division means for inputting an image which has image property information for each pixel, and dividing the input image into a plurality of blocks;
compression means for compressing each of the divided blocks to generate compression data for each block;
storage control means for storing sequentially, into a memory, the compression data generated by said compression means;
first control means for controlling said storage control means so as to generate a first packet including compression data of a block of interest and record the generated first packet into the memory, if total data size of all pieces of compression data stored in the memory does not exceed a predetermined data size upon generating compression data of the block of interest by said compression means;
a second control means for controlling said storage control means so as to generate a second packet and record the generated second packet into the memory if the total data size exceeds the predetermined data size upon generating compression data of the block of interest by said compression means, wherein the second packet includes representative image property information representing the block of interest and includes compression data of the block of interest excluding the image property information;
expansion means for expanding sequentially each packet stored in the memory;
first output means for outputting data of each pixel and image property information of each pixel in the block of interest represented by an expanded packet of interest, if there is the image property information for each pixel in the block of interest represented by the expanded packet of interest; and
second output means for outputting the representative image property information included in an expanded packet of interest as the image property information for each pixel in the block of interest represented by the expanded packet of interest, and outputting data of each pixel, in the block of interest represented by the expanded packet of interest, if there is not the image property information for each pixel in the block of interest represented by the expanded packet of interest.

11. A computer-readable recording medium storing a program for causing a computer to execute:

- a division procedure of inputting an image which has image property information for each pixel, and dividing the input image into a plurality of blocks;
- a compression procedure of compressing each of the divided blocks to generate compression data for each block;
- a storage control procedure of storing sequentially, into a memory, the compression data generated in said compression procedure;
- a first control procedure of controlling said storage control procedure so as to generate a first packet including compression data of a block of interest and record the generated first packet into the memory, if total data size of all pieces of compression data stored in the memory does not exceed a predetermined data size upon generating compression data of the block of interest in said compression procedure;
- a second control procedure of controlling said storage control procedure so as to generate a second packet and record the generated second packet into the memory if the total data size exceeds the predetermined data size upon generating compression data of the block of interest in said compression procedure, wherein the second packet includes representative image property information representing the block of interest and includes compression data of the block of interest excluding the image property information;
- an expansion procedure of expanding sequentially each packet stored in the memory;
- a first output procedure of outputting data of each pixel and image property information of each pixel in the block of interest represented by an expanded packet of interest, if there is the image property information for each pixel in the block of interest represented by the expanded packet of interest; and
- a second output procedure of outputting the representative image property information included in an expanded packet of interest as the image property information for each pixel in the block of interest represented by the expanded packet of interest, and outputting data of each pixel, in the block of interest represented by the expanded packet of interest, if there is not the image property information for each pixel in the block of interest represented by the expanded packet of interest.

* * * * *